(12) United States Patent
Miyafuji et al.

(10) Patent No.: US 10,077,375 B2
(45) Date of Patent: Sep. 18, 2018

(54) CURABLE COMPOSITION

(71) Applicant: Kaneka Corporation, Osaka (JP)

(72) Inventors: Kiyoshi Miyafuji, Hyogo (JP); Yu Itano, Hyogo (JP); Katsuyu Wakabayashi, Westerlo-Oevel (BE)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 14/894,977

(22) PCT Filed: May 29, 2014

(86) PCT No.: PCT/JP2014/064206
§ 371 (c)(1),
(2) Date: Nov. 30, 2015

(87) PCT Pub. No.: WO2014/192842
PCT Pub. Date: Dec. 4, 2014

(65) Prior Publication Data
US 2016/0137872 A1    May 19, 2016

(30) Foreign Application Priority Data

May 30, 2013 (JP) ................................ 2013-114605

(51) Int. Cl.
| C09D 133/10 | (2006.01) |
| C09D 133/08 | (2006.01) |
| C09D 133/06 | (2006.01) |
| C09D 171/02 | (2006.01) |
| C09D 201/10 | (2006.01) |
| C08L 71/02 | (2006.01) |
| C08L 101/10 | (2006.01) |
| C08F 220/18 | (2006.01) |
| C08L 33/06 | (2006.01) |
| C09D 143/04 | (2006.01) |
| C09K 3/10 | (2006.01) |
| C08G 65/336 | (2006.01) |

(52) U.S. Cl.
CPC .......... *C09D 133/10* (2013.01); *C08F 220/18* (2013.01); *C08L 33/06* (2013.01); *C08L 71/02* (2013.01); *C08L 101/10* (2013.01); *C09D 133/06* (2013.01); *C09D 133/08* (2013.01); *C09D 143/04* (2013.01); *C09D 171/02* (2013.01); *C09D 201/10* (2013.01); *C08G 65/336* (2013.01); *C08L 2205/05* (2013.01); *C09K 3/1006* (2013.01)

(58) Field of Classification Search
CPC .. C09D 133/10; C09D 133/08; C09D 143/04; C09D 201/10; C08F 220/18; C08F 220/14; C08F 2220/1858; C08F 2230/085; C08F 2220/1891; C08L 33/06; C08L 71/02; C08L 33/04; C09K 3/1006
USPC ....................... 524/425, 437, 506
See application file for complete search history.

(56) References Cited

U.S. PATENT DOCUMENTS

| 7,473,441 | B2 * | 1/2009 | Iwakirii ............... C08G 65/336 427/387 |
| 2006/0241249 | A1 | 10/2006 | Kasai et al. |
| 2011/0098410 | A1 * | 4/2011 | Harumashi .......... C08G 65/336 525/100 |
| 2014/0094553 | A1 | 4/2014 | Fujimoto et al. |
| 2015/0266271 | A1 | 9/2015 | Okamoto |

FOREIGN PATENT DOCUMENTS

| CN | 1668698 A | 9/2005 |
| JP | S52-73998 A | 6/1977 |
| JP | S59-122541 A | 7/1984 |
| JP | 05059267 A * | 3/1993 |
| JP | 2001-323210 A | 11/2001 |
| JP | 2003-221501 A | 8/2003 |
| JP | 2003-313418 A | 11/2003 |
| JP | 2004-083606 A | 3/2004 |
| JP | 2008-106228 A | 5/2008 |
| JP | 2009-024107 A | 2/2009 |
| JP | 2012-041393 A | 3/2012 |
| WO | 2007/094275 A1 | 8/2007 |
| WO | 20071094275 A1 | 8/2007 |
| WO | 2009/133811 A1 | 11/2009 |

(Continued)

OTHER PUBLICATIONS

JP 05-059267 A (1997), machine translation, JPO Japan Platform for Patent Information.*
International Search Report issued in PCT/JP2014/0664206 dated Aug. 26, 2014 (2 pages).
Written Opinion of the International Searching Authority issued in PCT/JP2014/0664206 dated Aug. 26, 2014 (6 pages).
Office Action issued in Chinese Application No. 201480031305.7; dated Feb. 12, 2018 (9 pages).

*Primary Examiner* — Josephine L Chang
(74) *Attorney, Agent, or Firm* — Osha Liang LLP

(57) ABSTRACT

A curable composition includes organic polymer (A) having more than one reactive silicon group on average per molecule, represented by formula (1): $-SiR^1_a X_{3-a}$ (1), wherein $R^1$ is a substituted or unsubstituted hydrocarbon group having 1-20 carbon atoms, each X is independently a hydroxy group or a hydrolyzable group, and a is 0 or 1, and (meth)acrylate-based polymer (B) having a reactive silicon group represented by formula (2): $-SiX_3$ (2), wherein each X is as defined for the formula (1), polymer (B) has a reactive silicon group equivalent of not less than 0.30 mmol/g, and wherein a monomer (b1) is free of a reactive silicon group, a glass transition temperature of its homopolymer is not more than 80° C., and is contained as monomer(s) constituting polymer (B) in a proportion of not less than 40 wt % per 100 wt % of total monomer.

20 Claims, No Drawings

(56) References Cited

FOREIGN PATENT DOCUMENTS

| WO | 20091133811 A1 | 11/2009 |
| WO | 2012/117902 A1 | 9/2012 |
| WO | 2014050592 A1 | 4/2014 |

* cited by examiner

CURABLE COMPOSITION

TECHNICAL FIELD

The present invention relates generally to a curable composition containing an organic polymer having a hydroxy group or hydrolyzable group on a silicon atom and a silicon group capable of forming a siloxane bond (hereinafter to be also referred to as a "reactive silicon group").

BACKGROUND ART

Organic polymers containing reactive silicon are known to react even at room temperature due to moisture etc., and crosslink by a siloxane condensation reaction of a reactive silicon group to produce a rubbery cured product. Of these, polyoxyalkylene polymer having a reactive silicon group has a comparatively low viscosity, and is superior in the workability in forming a compound composition and using same. In addition, since a cured product obtained shows good property balance of mechanical property, weather resistance, dynamic durability and the like, it is widely used as a sealing material, an adhesive, a paint and the like (patent document 1). Workability and various properties of a curable composition containing a reactive silicon group-containing organic polymer can be adjusted by adding various components such as filler, plasticizer and the like. To impart weather resistance and adhesiveness, it is practical to use reactive-silicon group-containing polyoxyalkylene and a reactive silicon group-containing (meth)acrylate-based polymer in combination (patent document 2). These are utilized as high weather resistant sealants and industrial adhesives.

Patent document 3 discloses that a high-strength cured product can be obtained by a combination of reactive silicon group-containing polyoxyalkylene and (meth)acrylate-based polymer having a trifunctional reactive silicon group.

DOCUMENT LIST

Patent Documents patent document 1: JP-A-52-73998
patent document 2: JP-A-59-122541
patent document 3: WO 2009/133811

SUMMARY OF THE INVENTION

When the compositions described in the Examples of patent document 3 are utilized for obtaining a cured product with high strength, use of a large amount of a (meth)acrylic monomer having a high glass transition temperature of homopolymer, particularly methylmethacrylate, has been considered to be essential. As a result, the viscosity is high and the workability tends to be poor. While a plasticizer is generally added to ensure workability of a composition, when a plasticizer is added to the composition, the strength of the product is markedly degraded. Thus, provision of a curable composition superior in the balance of viscosity and mechanical property is associated with a problem. One or more embodiments of the present invention provide a curable composition having low viscosity and affording a cured product with high strength.

Means of Solving the Problems

One or more embodiments of the invention provide the following:

(1). A curable composition comprising
organic polymer (A) having more than one reactive silicon group on average per molecule, which is represented by the formula (1):

$$-SiR^1{}_aX_{3-a} \quad (1)$$

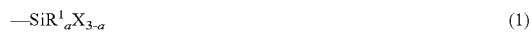

wherein $R^1$ is a substituted or unsubstituted hydrocarbon group having 1-20 carbon atoms, each X is independently a hydroxy group or a hydrolyzable group, and a is 0 or 1, and
(meth)acrylate-based polymer (B) having a reactive silicon group represented by the formula (2):

$$-SiX_3 \quad (2)$$

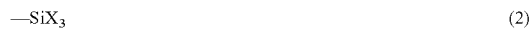

wherein each X is as defined for the formula (1), polymer (B) has a reactive silicon group equivalent of not less than 0.30 mmol/g, and wherein
a monomer (b1) is free of a reactive silicon group, a glass transition temperature of its homopolymer is not more than 80° C., and is contained as monomer(s) constituting polymer (B) in a proportion of not less than 40 wt % per 100 wt % of the total monomer.

(2). The curable composition of (1), wherein the reactive silicon group of polymer (B) is a trimethoxysilyl group.

(3). The curable composition of (1) or (2), wherein the polymer (B) has not less than 1.5 reactive silicon groups on average per molecule.

(4). The curable composition of any one of (1)-(3), wherein a glass transition temperature of the homopolymer of (meth)acrylate monomer (b1) constituting polymer (B) is not more than 10° C.

(5). The curable composition of any one of (1)-(4), wherein the glass transition temperature of the homopolymer of (meth)acrylate monomer (b1) constituting polymer (B) is not more than −30° C.

(6). The curable composition of any one of (1)-(5), wherein the monomer (b1) constituting (meth)acrylate-based polymer (B) comprises (meth)acrylate monomer (b1-a) having an alkyl group having 3-6 carbon atoms and a (meth)acrylate monomer (b1-b) having an alkyl group having 7-30 carbon atoms, wherein monomer (b1-a) and monomer (b1-b) are contained in a total of not less than 60 wt % per 100 wt % of the total monomer unit.

(7). The curable composition of any one of (1)-(6), wherein organic polymer (A) comprises a polyoxyalkylene-based polymer as the main chain skeleton.

(8). The curable composition of any one of (1)-(7), wherein polymer (A) has a number average molecular weight of not less than 20,000.

(9). The curable composition of any one of (1)-(8), wherein polymer (B) has a number average molecular weight of not less than 4,000.

(10). The curable composition of any one of (1)-(8), wherein polymer (B) has a number average molecular weight of not less than 10,000.

(11). The curable composition of any one of (1)-(8), wherein polymer (B) has a number average molecular weight of 500 to less than 4,000.

(12). The curable composition of any one of (1)-(11), wherein monomer (b2) is free of a reactive silicon group, a glass transition temperature of its homopolymer is not less than −25° C., and is contained as monomer(s) constituting polymer (B) in a proportion of not less than 40 wt % in total.

(13). The curable composition of any one of (1)-(12), wherein methyl methacrylate is contained in a proportion of not more than 30 wt % in total as a monomer (b2) constituting polymer (B)

(14). The curable composition of any one of (1)-(13), wherein a mixing ratio of polymer (A) and polymer (B) is (A):(B)=80:20-50:50 (parts by weight).
(15). The curable composition of any one of (1)-(14), wherein a mercapto compound is not used during polymerization of (meth)acrylate-based polymer (B).
(16). The curable composition of any one of (1)-(15), wherein polymer (A) has more than one reactive silicon group on average in one terminal portion.
(17). The curable composition of any one of (1)-(16), further comprising a high molecular weight plasticizer as plasticizer (C).
(18). The curable composition of (17), comprising polyoxyalkylene-based polymer as plasticizer (C).
(19). The curable composition of (17), comprising a (meth)acrylate-based polymer as plasticizer (C).
(20). The curable composition of any one of (17)-(19), wherein the high molecular weight plasticizer has not more than one reactive silicon group on average per molecule.
(21). The curable composition of any one of (1)-(20), further comprising, as a filler, heavy calcium carbonate having an average primary particle size of less than 1 μm.
(22). The curable composition of any one of (1)-(20), further comprising titanium oxide as a filler.
(23). The curable composition of any one of (1)-(20), further comprising aluminum hydroxide as a filler.
(24). A coating film waterproofing agent comprising the curable composition of any one of (1)-(23).
(25). A cured product obtained from the curable composition of any one of (1)-(23).

The curable composition having low viscosity according to one or more embodiments of the present invention affords a cured product having high strength.

DESCRIPTION OF EMBODIMENTS

Embodiments of the present invention are explained in detail in the following. In the present invention, a curable composition comprising organic polymer (A) having more than one reactive silicon group on average in one molecule, and (meth)acrylate-based polymer (B) having a trifunctional reactive silicon group, wherein a reactive silicon group equivalent thereof is not less than 0.30 mmol/g and, as a monomer constituting polymer (B), a (meth)acrylate monomer whose homopolymer having a glass transition temperature of not more than 80° C. is used. The main chain skeleton of the organic polymer (A) having a reactive silicon group to be used in one or more embodiments of the present invention is not particularly limited, and those having various main chain skeletons can be used. Since the composition to be obtained shows superior curability and adhesiveness, a main chain skeleton comprising one or more selected from a hydrogen atom, a carbon atom, a nitrogen atom, an oxygen atom and a sulfur atom is preferable.

Specific examples include polyoxyalkylene-based polymers such as polyoxyethylene, polyoxypropylene, polyoxybutylene, polyoxytetramethylene, oxyethylene-oxypropylene copolymer, oxypropylene-oxybutylene copolymer and the like; hydrocarbon-based polymers such as ethylene-propylene-based copolymer, polyisobutylene, copolymer of isobutylene and isoprene and the like, polychloroprene, polyisoprene, copolymer of isoprene or butadiene, and acrylonitrile and/or styrene and the like, polybutadiene, copolymer of isoprene or butadiene, acrylonitrile and styrene and the like, hydrogenated polyolefin-based polymers obtained by hydrogenation of these polyolefin-based polymers and the like; polyester-based polymer obtained by condensation of dibasic acid such as adipic acid and the like and glycol, or ring opening polymerization of lactones; (meth)acrylate-based polymer obtained by radical polymerization of monomers such as ethyl(meth)acrylate, butyl(meth)acrylate and the like; vinyl-based polymer obtained by radical polymerization of monomers such as (meth)acrylate-based monomer, vinyl acetate, acrylonitrile, styrene and the like; graft polymer obtained by polymerization of vinyl monomers in the aforementioned organic polymer; polysulfide-based polymer; polyamide-based polymers such as nylon 6 obtained by ring opening polymerization of ε-caprolactam, nylon 6,6 obtained by condensation polymerization of hexamethylenediamine and adipic acid, nylon 6,10 obtained by condensation polymerization of hexamethylenediamine and sebacic acid, nylon 11 obtained by condensation polymerization of ε-aminoundecanoic acid, nylon 12 by ring opening polymerization of ε-aminolaurolactam, copolymerized nylon comprising not less than 2 components from the components of the above-mentioned nylons and the like; polycarbonate-based polymer produced by condensation polymerization of, for example, bisphenol A and carbonyl chloride and the like and diallylphthalate-based polymer.

Saturated hydrocarbon-based polymers such as polyisobutylene, hydrogenated polyisoprene, hydrogenated polybutadiene and the like, oxyalkylene-based polymer, and (meth)acrylate-based polymer are more preferable since they show comparatively low glass transition temperature, and the cured products to be obtained are superior in cold resistance.

While the glass transition temperature of the organic polymer to be component (A) is not particularly limited, it is preferably not more than 20° C., more preferably not more than 0° C., particularly preferably not more than −20° C. When the glass transition temperature exceeds 20° C., the viscosity becomes high in the winter season and in cold districts to sometimes degrade workability, and the flexibility of a cured product decreases and the elongation sometimes decreases. The aforementioned glass transition temperature is a value measured by DSC. In addition, an oxyalkylene-based polymer and a (meth)acrylate-based polymer are particularly preferable since they have high moisture permeability and, when they are used to form a one-component composition, the composition shows superior depth curability, and further, superior adhesiveness, and an oxyalkylene-based polymer is most preferable. Of the oxyalkylene-based polymers, an oxypropylene-based polymer is particularly preferable.

The reactive silicon group-containing organic polymer (A) has more than one reactive silicon group on average in one molecule, which is represented by the following formula (1):

(1). formula (1): —SiR$^1_a$X$_{3-a}$    (1)

wherein R$^1$ is a substituted or unsubstituted hydrocarbon group having 1-20 carbon atoms, each X is independently a hydroxy group or a hydrolyzable group, and a is 0 or 1.

Specific examples of R$^1$ in the formula (1) include alkyl groups such as methyl group, ethyl group and the like; cycloalkyl groups such as cyclohexyl group and the like; aryl groups such as phenyl group and the like; aralkyl groups such as benzyl group and the like; triorganosiloxy groups represented by —OSi(R')$_3$ (wherein R' is methyl group, phenyl group etc.)); fluoroalkyl groups such as fluoromethyl group, difluoromethyl group and the like; chloroalkyl groups such as chloromethyl group, 1-chloroethyl group and the like; alkoxyalkyl groups such as methoxymethyl group, ethoxymethyl group, phenoxymethyl group, 1-methoxyethyl group and the like; aminoalkyl groups such as aminomethyl group, N-methylaminomethyl group, N,N-dimethylaminomethyl group and the like; acetoxymethyl group, methylcarbamate group, 2-cyanoethyl group and the like. Of these, a methyl group is more preferable from the aspect of the availability of the starting material.

As a hydrolyzable group for X in the formula (1), a known hydrolyzable group can be mentioned. Specific examples of the hydrolyzable group include hydrogen, halogen, alkoxy group, alkenyloxy group, aryloxy group, acyloxy group, ketoxymate group, amino group, amido group, acid amide group, aminooxy group, mercapto group and the like. Of these, halogen, alkoxy group, alkenyloxy group, and acyloxy group are preferable since the activity is high, alkoxy group such as methoxy group, ethoxy group and the like is more preferable since it shows mild hydrolyzability and is easy to handle, and methoxy group and ethoxy group are particularly preferable. From the aspect of safety, therefore, ethoxy group and isopropenyloxy group are preferable, since the compound that leaves due to the reaction is ethanol and acetone, respectively.

As a reactive silicon group represented by the formula (1), trimethoxysilyl group, triethoxysilyl group, tris(2-propenyloxy)silyl group, triacetoxysilyl group, dimethoxymethylsilyl group, diethoxymethylsilyl group, diisopropoxymethylsilyl group, (chloromethyl)dimethoxysilyl group, (methoxymethyl)dimethoxysilyl group, (methoxymethyl)diethoxysilyl group, and (ethoxymethyl)dimethoxysilyl group are specifically preferable. Of these, dimethoxymethylsilyl group and trimethoxysilyl group are preferable since a cured product having high strength can be obtained. The aforementioned polyoxyalkylene-based polymer has a comparatively low glass transition temperature, and a cured product obtained therefrom is superior in cold resistance. In addition, it has high moisture permeability. When a one-component composition is provided, it characteristically shows superior depth curability, and superior adhesiveness.

Specific examples include polyoxyalkylene-based polymers such as polyoxyethylene, polyoxypropylene, polyoxybutylene, polyoxytetramethylene, oxyethylene-oxypropylene copolymer, oxypropylene-oxybutylene copolymer and the like.

The main chain structure of the oxyalkylene-based polymer may be composed of only one kind of repeat unit, or two or more kinds of repeat units. Particularly, when it is used for sealant, adhesive and the like, one composed of an oxypropylene-based polymer containing not less than 50 wt %, preferably not less than 80 wt %, of the oxypropylene repeat unit in the polymer main chain structure is preferable, since it is amorphous and comparatively low viscous.

The main chain structure of polymer (A) optionally has a polymer structure other than the oxyalkylene structure, as long as the effect of one or more embodiments of the invention is not impaired.

The main chain structure of polymer (A) may be linear or optionally has a branched chain. When a cured product with higher strength is desired, a branched chain polymer is preferable. When a cured product with higher elongation is desired, a linear polymer is preferable. When polymer (A) has a branched chain, the branched chain number is preferably 1-4, most preferably 1.

An oxyalkylene-based polymer is preferably one produced by ring opening polymerization reaction of a cyclic ether compound, by using a polymerization catalyst in the presence an initiator.

Examples of the cyclic ether compound include ethylene oxide, propylene oxide, butylene oxide, tetramethylene oxide, tetrahydrofuran and the like. Only one kind of these cyclic ether compounds may be used, or two or more kinds may be used in combination. Of these cyclic ether compounds, propylene oxide is particularly preferably used since amorphous polyether polymer having comparatively low viscosity can be obtained.

Examples of the initiator include alcohols such as ethylene glycol, propylene glycol, butanediol, hexamethylene glycol, neopentyl glycol, diethylene glycol, dipropylene glycol, triethylene glycol, glycerol, trimethylolmethane, trimethylolpropane, pentaerythritol, sorbitol and the like; oxyalkylene-based polymer having a number average molecular weight of 300-4,000 such as polyoxypropylene diol, polyoxypropylene triol, polyoxyethylene diol, polyoxyethylene triol and the like, and the like.

While the synthesis method of polyoxyalkylene-based polymer is not particularly limited, examples thereof include a polymerization method using an alkali catalyst such as KOH, a polymerization method using a transition metal compound-porphyrin complex catalyst such as a complex obtained by reacting an organic aluminum compound and porphyrin as shown in JP-A-61-215623, a polymerization method using a composite metal cyanide complex catalyst as shown in JP-B-46-27250, JP-B-59-15336, U.S. Pat. No. 3,278,457, U.S. Pat. No. 3,278,458, U.S. Pat. No. 3,278,459, U.S. Pat. No. 3,427,256, U.S. Pat. No. 3,427,334, U.S. Pat. No. 3,427,335 and the like, a polymerization method using a catalyst comprising a polyphosphagen salt shown in JP-A-10-273512, a polymerization method using a catalyst comprising a phosphagen compound shown in JP-A-11-060722 and the like. A polymerization method using a composite metal cyanide catalyst is more preferable for reasons of production cost, a polymer with narrow molecular weight distribution to be obtained and the like.

While the polymers exemplified for polymer (B) can be used as the main chain structure of the aforementioned (meth)acrylate-based polymer, no limitation is necessary on the monomer.

While the molecular weight distribution (Mw/Mn) of polymer (A) is not particularly limited, it is preferably narrow, and preferably less than 2.0, more preferably not more than 1.6, further preferably not more than 1.5, and particularly preferably not more than 1.4.

The number average molecular weight of polymer (A) as based on polystyrene by GPC preferably has a lower limit of not less than 10,000, more preferably not less than 15,000, particularly preferably not less than 20,000. The upper limit is preferably not more than 50,000, more preferably not more than 35,000, particularly preferably not more than 30,000. When the number average molecular weight of polymer (A) is small, the viscosity becomes low to improve workability during use of a curable composition. On the other hand, the obtained cured product tends to be hard and the elongation property tends to be degraded. When the molecular weight becomes too high, the concentration of reactive silicon group becomes too low, and the curing rate may become slow. In addition, the viscosity tends to become high and the handling tends to be difficult.

A method of introducing a reactive silicon group is not particularly limited, and a known method can be utilized. Examples of the introduction method are shown below.

(i) Hydrosilylation

A method including introducing an unsaturated bond into a polymer to be the starting material (hereinafter to be also indicated as "prepolymer"), and adding a hydrosilane compound to the unsaturated bond by a hydrosilylation reaction can be mentioned. An introduction method of the unsaturated bond may be any. For example, a method including reacting a prepolymer having a functional group such as hydroxy group and the like with a compound having a group that reacts with the functional group and an unsaturated bond to give a polymer containing an unsaturated bond; a method including copolymerization of a polymerizable monomer having an unsaturated bond; and the like can be mentioned.

(ii) Reaction of Reactive Group-Containing Polymer (Prepolymer) and Silane Coupling Agent A method including reacting a prepolymer having a reactive group such as hydroxy group, amino group, unsaturated bond and the like, and a compound having both a group that reacts with the reactive group thereof to form a bond and a reactive silicon group (also called silane coupling agent) can be mentioned. Examples of the combination of a reactive group of a prepolymer and a reactive group of a silane coupling agent include, but are not limited to, a hydroxy group and an isocyanate group, a hydroxy group and an epoxy group, an amino group and an isocyanate group, an amino group and a thioisocyanate group, an amino group and an epoxy group, an amino group and an acrylic structure (reaction by Michael addition), a carboxy group and an epoxy group, an unsaturated bond and a mercapto group and the like.

The method of the above-mentioned (i) is preferable since the reaction is convenient, the amount of the reactive silicon group to be introduced can be adjusted, and the property of the obtained reactive silicon group-containing polymer is stable. The method of the above-mentioned (ii) is preferable since it has many alternatives of the reaction and the introduction rate of the reactive silicon group can be increased easily.

Examples of the hydrosilane compound usable in the above-mentioned method of the above-mentioned (i) include halogenated silanes such as trichlorosilane, dichloromethylsilane, dichlorophenylsilane, (methoxymethyl)dichlorosilane and the like; alkoxysilanes such as dimethoxymethylsilane, diethoxymethylsilane, trimethoxysilane, triethoxysilane, (chloromethyl)dimethoxysilane, (methoxymethyl)dimethoxysilane and the like; isopropenyloxysilanes (deacetone type) such as triisopropenyloxysilane, (chloromethyl)diisopropenyloxysilane, (methoxymethyl)diisopropenyloxysilane and the like, and the like.

Examples of the silane coupling agent usable in the method of (ii) include the following compounds.

Mercaptosilanes that react with an unsaturated bond, such as 3-mercaptopropyltrimethoxysilane, 3-mercaptopropyldimethoxymethylsilane, 3-mercaptopropyltriethoxysilane, mercaptomethyltriethoxysilane, mercaptomethyldimethoxymethylsilane and the like; isocyanate silanes that react with a hydroxy group, such as 3-isocyanatepropyltrimethoxysilane, 3-isocyanatepropyldimethoxymethylsilane, 3-isocyanatepropyltriethoxysilane, isocyanatemethyltrimethoxysilane, isocyanatemethyltriethoxysilane, isocyanatemethyldimethoxymethylsilane and the like; epoxysilanes that react with a hydroxy group, an amino group or a carboxy group, such as 3-glycidoxypropyltrimethoxysilane, 3-glycidoxypropyldimethoxymethylsilane, 3-glycidoxypropyltriethoxysilane, glycidoxymethyltrimethoxysilane, glycidoxymethyltriethoxysilane, glycidoxymethyldimethoxymethylsilane and the like; aminosilanes that react with an isocyanate group or a thioisocyanate group, such as 3-aminopropyltrimethoxysilane, 3-aminopropyldimethoxymethylsilane, 3-aminopropyltriethoxysilane, 3-(2-aminoethyl)propyltrimethoxysilane, 3-(2-aminoethyl)propyldimethoxymethylsilane, 3-(2-aminoethyl)propyltriethoxysilane, 3-(N-ethylamino)-2-methylpropyltrimethoxysilane, 3-ureidopropyltrimethoxysilane, 3-ureidopropyltriethoxysilane, N-phenyl-3-aminopropyltrimethoxysilane, N-benzyl-3-aminopropyltrimethoxysilane, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane, N,N'-bis[3-(trimethoxysilyl)propyl]ethylenediamine, bis(3-(trimethoxysilyl)propyl)amine and the like; hydroxyalkyl silanes 3-hydroxypropyltrimethoxysilane, hydroxymethyltriethoxysilane and the like, and the like. The above-mentioned silane coupling agent is one embodiment and a silyl group can be introduced utilizing or applying a similar reaction.

The main chain skeleton of polymer (A) may contain other components such as urethane bond component and the like as long as the effect of one or more embodiments of the invention is not markedly impaired. The urethane bond component is not particularly limited, and a group produced by a reaction of an isocyanate group and an active hydrogen group (hereinafter to be also referred to as an amide segment) can be mentioned.

A cured product obtained by curing a curable composition containing a polymer having a urethane bond or ester bond in the main chain sometimes provides effects of high hardness and high strength due to the action of a hydrogen bond and the like. On the other hand, a urethane bond may be cleaved due to the heat and the like. To impart such property to the curable composition according to one or more embodiments of the present invention, an amide segment may be introduced into the polymer or the amide segment may be intentionally eliminated. Polymer (A) having an amide segment tends to show high viscosity. A polymer having an amide segment sometimes shows improved curability.

The above-mentioned amide segment is a group represented by the formula (3):

$$-NR_2-C(=O)- \qquad (3)$$

wherein $R^2$ is an organic group having 1-10 carbon atoms or a hydrogen atom.

Specific Examples of the aforementioned amide segment include a urethane group produced by a reaction of an isocyanate group and a hydroxy group, or an amino group and carbonate; a urea group produced by a reaction of an isocyanate group and an amino group; a thiourethane group produced by a reaction of an isocyanate group and a mercapto group and the like. In one or more embodiments of the present invention, moreover, a group produced by a further reaction of active hydrogen in the above-mentioned urethane group, urea group, and thiourethane group, and an isocyanate group is also encompassed in the group of the formula (3).

Examples of the industrially feasible production method of an oxyalkylene-based polymer having an amide segment and a reactive silicon group include a method comprising reacting a polyoxyalkylene-based polymer having an active hydrogen-containing group on the terminal with an excess polyisocyanate compound to give a polymer having an isocyanate group on the terminal of the polyurethane-based main chain, and thereafter or simultaneously therewith, reacting a part or whole of the isocyanate group with a Z group of a silicon compound represented by the formula (4):

$$Z-R^3-SiR^1_aX_{3-a} \qquad (4)$$

($R^1$, X and a are as defined above, $R^3$ is a divalent organic group, more preferably a hydrocarbon group having 1 to 20 carbon atoms, and Z is an active hydrogen-containing group selected from hydroxy group, carboxy group, mercapto group and (primary or secondary) amino group).

In addition, one produced by reacting a polyoxyalkylene-based polymer having an active hydrogen-containing group on the terminal with a reactive silicon group-containing isocyanate compound represented by the formula (5):

$$O=C=N-R^3-SiR^1_aX_{3-a} \quad (5)$$

($R^3$, $R^1$, X and a are as defined above) can be mentioned.

While the silicon compound of the formula (4) is not particularly limited, specific examples thereof include amino group-containing silanes such as γ-aminopropyldimethoxymethylsilane, γ-aminopropyltrimethoxysilane, N-(β-aminoethyl)-γ-aminopropyltrimethoxysilane, N-(β-aminoethyl)-γ-aminopropyldimethoxymethylsilane, (N-phenyl)-γ-aminopropyltrimethoxysilane, N-ethylaminoisobutyltrimethoxysilane, and the like; hydroxy group-containing silanes such as γ-hydroxypropyltrimethoxysilane and the like; mercapto group-containing silanes such as γ-mercaptopropyltrimethoxysilane, mercaptomethyltriethoxysilane and the like; and the like. Moreover, as described in JP-A-6-211879 (U.S. Pat. No. 5,364,955), JP-A-10-53637 (U.S. Pat. No. 5,756,751), JP-A-10-204144 (EP0831108), JP-A-2000-169544 and JP-A-2000-169545, Michael addition reaction product of various α,β-unsaturated carbonyl compounds and primary amino group-containing silane, and a Michael addition reaction product of various (meth)acryloyl group-containing silanes and a primary amino group-containing compound can also be used as the silicon compound represented by the formula (4).

While the reactive silicon group-containing isocyanate compound of the formula (5) is not particularly limited, specific examples thereof include γ-trimethoxysilylpropyl isocyanate, γ-triethoxysilylpropyl isocyanate, γ-methyldimethoxysilylpropyl isocyanate, γ-methyldiethoxysilylpropylisocyanate, γ-(methoxymethyl)dimethoxysilylpropylisocyanate, trimethoxysilylmethyl isocyanate, triethoxymethylsilylmethyl isocyanate, dimethoxymethylsilylmethyl isocyanate, diethoxymethylsilylmethyl isocyanate, (methoxymethyl)dimethoxysilylmethylisocyanate and the like.

When polymer (A) contains an amide segment in the main skeleton, the number on average of the amide segment per 1 molecule of polymer (A) is preferably 1-10, more preferably 1.5-5, particularly preferably 2-3. When it is less than 1, curability may not be sufficient, and when it is larger than 10, polymer has high viscosity and handling may become difficult.

To lower the viscosity of the curable composition and improve workability, polymer (A) is preferably substantially free of an amide segment.

Polymer (A) may have, on average, more than one reactive silicon group in one terminal portion. Generally, when a reactive silicon group is introduced by the method of the above-mentioned (i), the reactive silicon group is limited to not more than 1 on average on one terminal portion. In contrast, more than one reactive silicon can be introduced into one terminal portion by reacting a prepolymer with an epoxy compound having a carbon-carbon unsaturated bond, and further modifying an alcohol terminal into an unsaturated group.

As an epoxy compound having a carbon-carbon unsaturated bond, (meth)allylglycidyl ether, glycidyl (meth)acrylate, butadiene monooxide, 1,4-cyclopentadiene monoepoxide are specifically preferable from the aspect of reaction activity, and allylglycidyl ether is particularly preferable. In the DESCRIPTION and claims, (meth)allyl shows allyl and/or methallyl. As the amount of the epoxy compound having a carbon-carbon unsaturated bond to be added, any amount can be determined in consideration of the amount and reactivity of the carbon-carbon unsaturated bond to be introduced into the polyoxyalkylene-based polymer. Particularly, the lower limit of the molar ratio to the hydroxyl group contained in the polyoxyalkylene-based polymer is preferably not less than 0.2, more preferably not less than 0.5. The upper limit is preferably not more than 5.0, more preferably not more than 2.0.

The reaction temperature of the ring opening addition reaction of a prepolymer and an epoxy compound having a carbon-carbon unsaturated bond is preferably not less than 60° C. and not more than 150° C., more preferably not less than 110° C. and not more than 140° C. When it is low, the reaction scarcely proceeds, and when it is too high, the main chain of the polyoxyalkylene-based polymer may be decomposed.

In the structure of a polymer having an unsaturated bond and before introduction of a reactive silicon group, which is obtained by the above-mentioned method, the terminal portion has a structure represented by the formula (6):

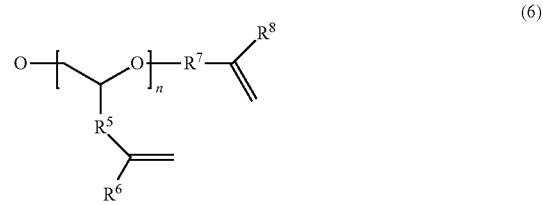

(6)

wherein $R^5$ and $R^7$ are each independently a divalent organic group having 1-10 carbon atoms, the atom bonded to each adjacent carbon atom is any of carbon, oxygen and nitrogen, $R^6$ and $R^8$ are each independently hydrogen or a hydrocarbon group having 1-10 carbon atoms, and n is an integer of 1 to 10.

The number of the reactive silicon group of polymer (A) is preferably not less than 0.5, more preferably not less than 1.0, further preferably not less than 1.1, most preferably not less than 1.5, on average in one terminal portion.

The lower limit of the average number of the reactive silicon groups of polymer (A) per molecule is more than 1, preferably not less than 1.2, more preferably not less than 1.3, more preferably not less than 1.5, most preferably not less than 1.7. The upper limit thereof is preferably not more than 6.0, more preferably not more than 5.5, most preferably not more than 5.0. The number of the reactive silicon groups of less than 1.0 is not preferable since a cured product with high strength may not be obtained. The number of the reactive silicon groups exceeding 6.0 is not preferable since a cured product with high elongation may not be obtained.

The average number of the reactive silicon groups of polymer (A) is defined to be an average number obtained by quantification of protons on carbon directly bonded to a reactive silicon group by high resolution $^1$H-NMR method. In the calculation of the average number of the reactive silicon groups in the polymer according to one or more embodiments of the present invention, a prepolymer into which a reactive silicon group was not introduced and a polymer obtained by side reaction, into which a reactive silicon group was not introduced, during introduction of a reactive silicon group into a prepolymer, are considered to partly form components of polymer (A) having the same main chain structure and included in the parameter (molecule number) of calculation of the average number of the reactive silicon groups in one molecule.

The reactive silicon group-containing (meth)acrylate-based polymer (B) according to one or more embodiments of the present invention is not particularly limited as long as it has a reactive silicon group represented by the following formula (2) in the molecular chain terminal and/or side chain, has a reactive silicon group equivalent thereof of not less than 0.30 mmol/g, and contains, as a monomer constituting polymer (B), not less than 40 parts by weight in total of monomer (b1) whose homopolymer having a glass transition temperature of not more than 80° C.

In one or more embodiments of the present invention, "(meth)acryl" shows "acryl and/or methacryl".

$$-SiX_3 \quad (2)$$

wherein X is as defined for the formula (1). To obtain a cured product with high strength, reactive silicon group of polymer (B) needs to be a trifunctional reactive silicon group.

Specific examples of the reactive silicon group represented by the formula (2) include, but are not limited to, trimethoxysilyl group, triethoxysilyl group, tris(2-propenyloxy)silyl group, triacetoxysilyl group and the like. Of these, trimethoxysilyl group is preferable since it shows high activity and a cured product having high strength and highly strong mechanical property can be obtained.

To obtain a cured product having low viscosity and high strength, the monomer(s) constituting the main chain structure of the reactive silicon group-containing (meth)acrylate-based polymer (B) according to one or more embodiments of the present invention essentially contain(s) not less than 40 wt % in total of monomer (b1) free of a reactive silicon group, the homopolymer of the monomer having a glass transition temperature of not more than 80° C. The glass transition temperature (Tg) described in POLYMER HANDBOOK-FOURTH EDITION-(J. Brandrup et al.) can be referred to for the glass transition temperature of homopolymer.

Examples of the (meth)acrylate monomer (b1) include alkyl (meth)acrylate monomers such as methyl acrylate, ethyl (meth)acrylate, n-propyl (meth)acrylate, isopropyl (meth)acrylate, n-butyl (meth)acrylate, isobutyl (meth)acrylate, s-butyl (meth)acrylate, tert-butyl (meth)acrylate, neopentyl (meth)acrylate, n-hexyl (meth)acrylate, n-heptyl (meth)acrylate, n-octyl (meth)acrylate, 2-ethylhexyl (meth)acrylate, n-nonyl (meth)acrylate, decyl (meth)acrylate, undecyl (meth)acrylate, lauryl (meth)acrylate, tridecyl (meth)acrylate, tetradecyl (meth)acrylate, hexadecyl (meth)acrylate, stearyl (meth)acrylate, behenyl (meth)acrylate, cyclohexyl (meth)acrylate and the like; 2-methoxyethyl (meth)acrylate, 3-methoxybutyl (meth)acrylate and the like. Of these, a monomer whose homopolymer having a glass transition temperature of not more than 80° C., more preferably not more than 50° C., further preferably not more than 10° C., most preferably not more than −30° C., is preferably used since a cured product with high strength can be obtained. The lower limit is preferably not less than −200° C., more preferably not less than −150° C., most preferably not less than −100° C. A (meth)acrylate monomer having an alkyl group having 2-6 carbon atoms is particularly preferably used. Only one kind of these may be used, and/or two or more kinds thereof may be used in combination.

Monomer (b1) is preferably not less than 40 wt %, more preferably not less than 50 wt %, most preferably not less than 60 wt % in total, relative to 100 wt % of the whole monomer unit.

To improve compatibility with polymer (A), (meth)acrylic acid alkyl ester monomer (b1-a) having an alkyl group having 3-6 carbon atoms, and (meth)acrylic acid alkyl ester monomer (b1-b) having an alkyl group having 7-30 carbon atoms are preferably used in combination. In this case, the ratio of monomer (b1-a) and (b1-b) in weight ratio is preferably (b1-a):(b1-b)=95:5-20:80, more preferably 90:10-30:70, further preferably 80:20-50:50. Monomer (b1-a) and monomer (b1-b) are preferable not less than 50 wt %, more preferably not less than 60 wt %, most preferably not less than 70 wt % in total, relative to 100 wt % of the whole monomer unit.

When compatibility with polymer (A) is to be secured and strength of a cured product is to be further improved, methyl methacrylate is preferably used in combination as a monomer constituting polymer (B). The lower limit of methyl methacrylate is preferably not less than 3 wt %, more preferably not less than 5 wt %, most preferably not less than 10 wt %, relative to 100 wt % of the whole monomer unit. The upper limit is preferably not more than 50 wt %, preferably not more than 40 wt %, most preferably not more than 30 wt %. When the proportion of methyl methacrylate is too high, the viscosity of the curable composition unpreferably becomes high.

Specific examples of the monomer having a (meth)acrylic structure other than polymer (b1) include hetero atom-containing (meth)acrylate monomers such as 2-hydroxyethyl (meth)acrylate, 2-hydroxypropyl (meth)acrylate, 2,2,2-trifluoroethyl (meth)acrylate, 3,3,3-trifluoropropyl (meth)acrylate, 3,3,4,4,4-pentafluorobutyl (meth)acrylate, 2-perfluoroethyl-2-perfluorobutylethyl (meth)acrylate, trifluoromethyl (meth)acrylate, perfluoroethyl (meth)acrylate, bis(trifluoromethyl)methyl (meth)acrylate, 2-trifluoromethyl-2-perfluoroethylethyl (meth)acrylate, 2-perfluorohexylethyl (meth)acrylate, 2-perfluorodecylethyl (meth)acrylate, 2-perfluorohexadecylethyl (meth)acrylate, dimethylaminoethyl (meth)acrylate, chloroethyl (meth)acrylate, tetrahydrofurfuryl (meth)acrylate, glycidyl (meth)acrylate and the like. Only one kind of these may be used, or two or more kinds thereof may be used in combination.

In addition, a monomer copolymerizable therewith may also be used as long as the effect of one or more embodiments of the invention is not impaired. Examples of such monomer include styrene-based monomers such as styrene, vinyltoluene, α-methylstyrene, chlorostyrene, styrene sulfonic acid and the like; fluorine-containing vinyl monomers such as perfluoroethylene, perfluoropropylene, vinylidene fluoride and the like; maleic acid and a derivative thereof such as maleic acid, maleic anhydride, monoalkyl maleate, dialkyl maleate and the like; fumaric acid and a derivative thereof such as fumaric acid, monoalkyl fumarate, dialkyl fumarate and the like; maleimide-based monomers such as maleimide, methylmaleimide, ethylmaleimide, propylmaleimide, butylmaleimide, hexylmaleimide, octylmaleimide, dodecylmaleimide, stearylmaleimide, phenylmaleimide, cyclohexylmaleimide and the like; vinyl ester-based monomers such as vinyl acetate, vinyl propionate, vinyl pivalate, vinyl benzoate, vinyl cinnamate and the like; olefin-based monomers such as ethylene, propylene and the like; conjugated diene-based monomer such as butadiene, isoprene and the like; (meth)acrylamide; (meth)acrylonitrile; vinyl-based monomers such as vinyl chloride, vinylidene chloride, allyl chloride, allyl alcohol, ethyl vinyl ether, butyl vinyl ether and the like. Only one kind of other monomer may be used, or two or more kinds thereof may be used in combination.

From the aspect of compatibility with polymer (A), alkyl (meth)acrylate monomer is preferably contained in not less than 50 wt %, more preferably not less than 70 wt %.

Polymer (B) can be obtained by various polymerization methods, and the method thereof is not particularly limited. From the aspects of general versatility of monomer and easiness of control, a radical polymerization method is preferable.

The radical polymerization method can be classified into "general radical polymerization method" and "controlled radical polymerization method". The "general radical polymerization method" includes simple polymerization using a polymerization initiator such as azo-based compound, peroxide and the like, and is a convenient polymerization method. On the other hand, the "controlled radical polymerization method" can introduce a particular functional group into a controlled position such as terminal and the like. The "controlled radical polymerization method" can be further classified into "chain transfer agent method" and "living radical polymerization method". The "chain transfer agent method" is characterized in that polymerization is performed using a chain transfer agent having a particular functional group, and affords a vinyl-based polymer having a functional group on the terminal. On the other hand, the "living radical polymerization method" is characterized in that the polymer growth terminal grows without causing side reactions such as termination reaction and the like, and a polymer having a molecular weight nearly as designed is obtained. In one or more embodiments of the present invention, any of these polymerization methods may be used.

The "general radical polymerization method" specifically refers to a solution polymerization method, a bulk polymerization method and the like, wherein a polymerization initiator, a chain transfer agent, a solvent and the like are added and polymerization is performed at 50-150° C.

Examples of the polymerization initiator include azo-based compounds such as 2,2'-azobis(2-methylbutyronitrile), dimethyl 2,2'-azobis(2-methylpropionate), 2,2'-azobis(2,4-dimethylvaleronitrile), 2,2'-azobis(4-methoxy-2,4-dimethylvaleronitrile), 2,2'-azobis[N-(2-propenyl)-2-methylpropionamide], 1,1'-azobis(cyclohexane-1-carbonitrile) and the like; diacyl peroxides such as benzoyl peroxide, isobutyryl peroxide, isononanoyl peroxide, decanoyl peroxide, lauroyl peroxide, parachlorobenzoyl peroxide, di(3,5,5-trimethylhexanoyl) peroxide and the like; peroxydicarbonates such as diisopropyl peroxy-dicarbonate, di-sec-butyl peroxy-dicarbonate, di-2-ethylhexyl peroxy-dicarbonate, di-1-methylheptyl peroxy-dicarbonate, di-3-methoxybutyl peroxy-dicarbonate, dicyclohexyl peroxy-dicarbonate and the like; peroxyesters such as tert-butyl peroxy-benzoate, tert-butyl peroxy-acetate, tert-butyl peroxy-2-ethylhexanoate, tert-butyl peroxy-isobutyrate, tert-butyl peroxy-pivalate, tert-butyl diperoxy-adipate, cumyl peroxy-neodecanoate and the like; ketone peroxides such as methyl ethyl ketone peroxide, cyclohexanone peroxide and the like; dialkyl peroxides such as di-tert-butyl peroxide, dicumyl peroxide, tert-butyl cumyl peroxide, 1,1-di(tert-hexyl peroxy)-3,3,5-trimethylcyclohexane and the like; hydroperoxides such as cumene hydroxyperoxide, tert-butyl hydroperoxide and the like; peroxides such as 1,1-di(tert-hexyl peroxy)-3,3,5-trimethylcyclohexane and the like, and the like. Only one kind of these polymerization initiators may be used, or two or more kinds thereof may be used in combination.

Examples of the chain transfer agent include mercapto group-containing compounds such as n-dodecyl mercaptan, tert-dodecyl mercaptan, lauryl mercaptan and the like. When a reactive silicon group is desired to be introduced into a molecular chain terminal of a (meth)acrylic polymer, for example, a compound having a reactive silicon group and a mercapto group, such as 3-mercaptopropyltrimethoxysilane, (mercaptomethyl)trimethoxysilane and the like is preferably used. Only one kind of these may be used, or two or more kinds thereof may be used in combination. When a cured product superior in weather resistance is desired, use of a mercapto group-containing compound is preferably avoided during polymerization.

Examples of the solvent include aromatic compounds such as toluene, xylene, styrene, ethylbenzene, paradichlorobenzene, di-2-ethylhexyl phthalate, di-n-butyl phthalate and the like; hydrocarbon compounds such as hexane, heptane, octane, cyclohexane, methylcyclohexane and the like; carboxylate compounds such as butyl acetate, n-propyl acetate, isopropyl acetate and the like; ketone compounds such as methyl isobutyl ketone, methyl ethyl ketone and the like; dialkyl carbonate compounds such as dimethyl carbonate, diethyl carbonate and the like; alcohol compounds such as n-propanol, 2-propanol, n-butanol, 2-butanol, isobutanol, tert-butanol, amyl alcohol and the like, and the like. Of these, one or more kinds selected from a dialkyl carbonate compound and an alcohol compound are preferable since it is not a Ministry of Health, Labour and Welfare pointer value formulation substance and in terms of odor, environmental burden and the like. Dimethyl carbonate, n-propanol, 2-propanol, n-butanol, 2-butanol, isobutanol, tert-butanol are more preferable, 2-propanol and isobutanol are particularly preferable, since boiling point and emission of all volatile organic compounds from the composition by the measurement method described in GEV Specification and Classification Criteria, Feb. 14, 2001 version prescribed by GEV (Gemeinschaft Emissionskontrollierte Verlegewerkstoffe, e.V.) can be suppressed.

It is possible to polymerize together with polymer (A) and a precursor compound thereof, the below-mentioned plasticizer and the like.

As compared to the "general radical polymerization method", the "chain transfer agent method" is a polymerization method capable of quantitatively introducing a functional group into a polymer terminal. The radical polymerization using a chain transfer agent is not particularly limited and examples thereof include a method of obtaining a polymer having a halogen terminal by using halogenated hydrocarbon as a chain transfer agent, as shown in JP-A-4-132706, a method of obtaining a polymer having a hydroxy group terminal by using hydroxy group-containing mercaptan or hydroxy group-containing polysulfide and the like as a chain transfer agent, as shown in JP-A-61-271306, JP-B-2594402, JP-A-54-47782, and the like.

The "living radical polymerization method" is, different from the aforementioned polymerization method, a polymerization method capable of affording a polymer having any molecular weight, narrow molecular weight distribution, and low viscosity, and further, capable of introducing a monomer having a particular functional group into almost any position of the polymer. In a narrow sense, the living polymerization refers to polymerization wherein the terminal is always active and the molecular chain keeps growing. In general, it also includes quasiliving polymerization wherein inactivated terminal and activated terminal in an equilibrium state keep growing.

The "living radical polymerization method" includes, for example, one using a cobalt porphyrin complex as shown in Journal of the American Chemical Society (J. Am. Chem. Soc.), 1994, vol. 16, p. 7943, one using nitrooxide radical as shown in JP-A-2003-500378, atom transfer radical polymerization (ATRP method) using organic halide, halogenated sulfonyl compound and the like as an initiator, and transition metal complex as a catalyst, as shown in JP-A-11-130931, and the like. In the present application, what is called a reverse atom transfer radical polymerization, as shown in Macromolecules, 1999, vol. 32, p. 2872, that is, a polymerization method producing a highly oxidized state when a general atom transfer radical polymerization catalyst has generated radical (e.g., equilibrium state similar to atom transfer radical polymerization, produced by reacting a general radical initiator such as peroxide and the like with Cu(II') when Cu(I) is used as a catalyst) is also included in the atom transfer radical polymerization.

As a polymerization method other than these, a method of obtaining an acrylic polymer by using a metallocene catalyst and a thiol compound having at least one reactive silicon group in a molecule, as shown in JP-A-2001-040037, a high temperature continuous polymerization method including continuously polymerizing a vinyl monomer in a stirring vessel type reactor, as shown in JP-A-57-502171, JP-A-59-006207, JP-A-60-511992 and the like, can also be used. A method of introducing a reactive silicon group into a (meth)acrylate-based polymer is not particularly limited and, for example, the following methods (i)-(iv) can be used.

(i) A method of copolymerizing a compound having a polymerizable unsaturated group and a reactive silicon group with monomer (b) having the above-mentioned (meth)acrylic structure.
(ii) A method of copolymerizing monomer (b) having a (meth)acrylic structure in the presence of the aforementioned compound having a reactive silicon group and a mercapto group as a chain transfer agent.
(iii) A method comprising copolymerizing a compound having a polymerizable unsaturated group and a reactive functional group (Z group) (e.g., acrylic acid, 2-hydroxyethyl acrylate) with monomer (b) having a (meth)acrylic structure, and reacting same with a compound having a reactive silicon group and a functional group reactive with the Z group (e.g., isocyanate silane compound).
(iv) A method comprising copolymerizing monomer (b) having a (meth)acrylic structure by a living radical polymerization method, and introducing a reactive silicon group into a molecular chain terminal.

These methods can be used in any combination.

It is more preferable to use, of these methods, methods (i) and (ii) in combination, since a reactive silicon group can be introduced into both the molecular chain terminal and/or the side chain. In addition, method (iv) is more preferable since a polymer having any molecular weight, narrow molecular weight distribution, and low viscosity can be obtained.

Examples of the compound having a polymerizable unsaturated group and a reactive silicon group include a compound having a (meth)acryloxy group and a reactive silicon group, such as 3-(meth)acryloxypropyltrimethoxysilane, 3-(meth)acryloxypropyltriethoxysilane, (meth)acryloxymethyltrimethoxysilane, and the like; a compound having a vinyl group and a reactive silicon group, such as vinyltrimethoxysilane, vinyltriethoxysilane and the like, and the like. Only one kind of these compounds may be used, or two or more kinds thereof may be used in combination.

While the number average molecular weight of polymer (B) is not particularly limited, the lower limit is preferably not less than 400, more preferably not less than 500, for a polymer having a low molecular weight, based on the polystyrene molecular weight by GPC measurement. The upper limit is preferably less than 5,000, more preferably less than 4,000. For a high molecular weight polymer, the lower limit is preferably not less than 4,000, more preferably not less than 6,000, particularly preferably not less than 10,000. The upper limit is preferably not more than 100,000, more preferably not more than 50,000, particularly preferably not more than 30,000. In low molecular weight polymer (B), as constituent monomer(s), monomer (b2) having a glass transition temperature of homopolymer of not less than $-25°$ C. and having no reactive silicon group is preferably used in not less than 10 wt %, more preferably not less than 20 wt %, particularly preferably not less than 40 wt %, in total. When a monomer whose homopolymer having a glass transition temperature of lower than $-25°$ C. is used, the strength may not be expressed sufficiently.

In high molecular weight polymer (B), sufficient strength is expressed by using monomer (b1) whose homopolymer having a glass transition temperature of not more than 80° C. in not less than 40 parts by weight in total, and other particular limitation is not necessary. To obtain a curable composition having lower viscosity, monomer (b1) with a lower glass transition temperature is preferably used, and a monomer with glass transition temperature being not more than 80° C. is preferable, not more than 50° C. is more preferable, not more than 10° C. is further preferable, not more than $-30°$ C. is most preferable.

Monomer (b1) is a monomer with a glass transition temperature being not more than 80° C.; a monomer with a glass transition temperature being not less than $-25°$ C. is monomer (b2) as mentioned above. A monomer with a glass transition temperature being not less than $-25°$ C. and not more than 80° C. functions as both monomer (b1) and monomer (b2). Therefore, such monomer is monomer (b1) and also monomer (b2) in one or more embodiments of the present invention.

Specific examples of the monomer (b2) include methyl (meth)acrylate, ethyl (meth)acrylate, n-propyl methacrylate, isopropyl methacrylate, n-butyl methacrylate, isobutyl methacrylate, s-butyl methacrylate, tert-butyl methacrylate, neopentyl methacrylate, n-hexyl methacrylate, n-heptyl methacrylate and the like. Of these, methyl (meth)acrylate, ethyl (meth)acrylate, n-butyl methacrylate, isobutyl methacrylate and tert-butyl methacrylate is more preferable, since a cured product having high strength can be obtained.

While the reactive silicon group in polymer (B) may be introduced into any of a molecular chain terminal and a side chain, it is preferably introduced into both the molecular chain terminal and the side chain from the aspect of adhesiveness. To obtain a cured product having high strength, the lower limit of the number of reactive silicon groups is preferably not less than 1.3, more preferably not less than 1.5, most preferably not less than 1.8, on average per molecule. The upper limit is preferably not more than 8.0, more preferably not more than 7.0, most preferably not more than 6.0. When defined by a reactive silicon group equivalent, the lower limit is preferably not less than 0.30 mmol/g, more preferably not less than 0.35 mmol/g, most preferably not less than 0.40 mmol/g. The upper limit is preferably not more than 3.0 mmol/g, more preferably not more than 2.5 mmol/g, most preferably not more than 2.0 mmol/g.

While the mixing ratio of polymer (A) and polymer (B) is not particularly limited, polymer (A):polymer (B) is preferably 90:10-30:70 (parts by weight), more preferably 85:15-40:60 (parts by weight), particularly preferably 80:20-50:50 (parts by weight).

Only one kind of polymer (A) and (B) according to one or more embodiments of the present invention, or two or more kinds thereof may be used in combination.

In one or more embodiments of the present invention, a curing catalyst is used for curing polymers (A) and (B). Specific examples of the curing catalyst include titanium compounds such as tetrabutyl titanate, tetrapropyl titanate, titanium tetrakis(acetylacetonate), bis(acetylacetonate)diisopropoxytitanium, diisopropoxytitanium bis(ethylacetoacetate) and the like; tetravalent organic tin compounds such as dimethyltin diacetate, dimethyltin bis(acetylacetonate), dibutyltin dilaurate, dibutyltin maleate, dibutyltin phthalate, dibutyltin dioctanoate, dibutyltin bis(2-ethylhexanoate), dibutyltin bis(methylmaleate), dibutyltin bis(ethylmaleate), dibutyltin bis(butylmaleate), dibutyltin bis(octylmaleate), dibutyltin bis(tridecylmaleate), dibutyltin bis(benzylmaleate), dibutyltin diacetate, dioctyltin bis(triethoxysilicate), dioctyltin bis(ethylmaleate), dioctyltin bis(octylmaleate), dibutyltin dimethoxide, dibutyltin bis(nonylphenoxide), dibutenyltin oxide, dibutyltin oxide, dibutyltin bis(acetylacetonate), dibutyltin bis(ethylacetoacetonate), reaction product of dibutyltin oxide and silicate compound, reaction product of dibutyltin oxide and phthalate, dioctyltin dilaurate, dioctyltin diacetate, dioctyltin bis(acetylacetonate) and the like; organic aluminum compounds such as aluminum tris(acetylacetonate), aluminum tris(ethylacetoacetate), diisopropoxyaluminum ethylacetoacetate and the like; zirconium compounds such as zirconium tetrakis(acetylacetonate) and the like; carboxylic acid such as 2-ethylhexanoic acid, octylic acid, neodecanoic acid, oleic acid, naphthenic acid and the like; metal carboxylate such as tin carboxylate, lead carboxylate, bismuth carboxylate, potassium carboxylate, calcium carboxylate, barium carboxylate, titanium carboxylate, zirconium carboxylate, hafnium carboxylate, vanadium carboxylate, manganese carboxylate, iron carboxylate, cobalt carboxylate, nickel carboxylate and cerium carboxylate and the like; amidine compounds such as 1-(o-tolyl)biguanide, 1-phenylguanidine, 1,2-dimethyl-1,4,5,6-tetrahydropyrimidine, 1,5,7-triazabicyclo[4.4.0]deca-5-ene, 7-methyl-1,5,7-triazabicyclo[4.4.0]deca-5-ene, 1,8-diazabicyclo[5.4.0]undecene-7 (DBU), 1,5-diazabicyclo[4.3.0]nonene-5(DBN) and the like; boron trifluoride complex such as boron trifluoride, boron trifluoride diethyl ether complex, boron trifluoride ethylamine complex and the like; fluorine anion-containing compounds such as ammonium fluoride, tetrabutylammonium fluoride, potassium fluoride, cesium fluoride, hydrogen fluoride ammonium, 1,1,2,3,3,3-hexafluoro-1-diethylaminopropane (MEC81, common name, Ishikawa reagent), potassium hexafluorophosphate, $Na_2SiF_6$, $K_2SiF_6$, $(NH_4)_2SiF_6$ and the like, and the like.

Of these, dibutyltin-based compound, dioctyltin-based compound, tin carboxylate and carboxylic acid are preferable, since a cured product having high strength and high elongation can be obtained. Dioctyltin-based compound, tin carboxylate and carboxylic acid are more preferable since toxicity is low.

The amount of a condensation catalyst to be used is preferably about 0.01-10 parts by weight, more preferably 0.1-5 parts by weight, per 100 parts by weight of polymer (A) and polymer (B). Due to the surge of environmental problems in recent years, the amount of tin-based compounds to be used is being limited. Therefore, when a tin-based compound is used, the amount thereof is preferably less than 1 part by weight.

The curable composition according to one or more embodiments of the present invention may contain plasticizer (C). Addition of plasticizer enables adjustment of the viscosity and slump property of a curable composition, and mechanical properties of a cured product obtained by curing the curable composition, such as hardness, tensile strength, elongation and the like. Specific examples of the plasticizer include phthalate compounds such as dibutyl phthalate, diisononyl phthalate (DINP), diheptyl phthalate, di(2-ethylhexyl) phthalate, diisodecyl phthalate (DIDP), butyl benzyl phthalate and the like; terephthalate compounds such as bis(2-ethylhexyl)-1,4-benzenedicarboxylate and the like (specifically, trade name: EASTMAN168 (manufactured by EASTMAN CHEMICAL)); non-phthalate compounds such as diisononyl 1,2-cyclohexanedicarboxylate and the like (specifically, trade name: Hexamoll DINCH (manufactured by BASF)); polyvalent aliphatic carboxylate compounds such as dioctyl adipate, dioctyl sebacate, dibutyl sebacate, diisodecyl succinate, tributyl acetylcitrate and the like; unsaturated fatty acid ester compounds such as butyl oleate, methyl acetylricinoleate and the like; phenyl alkylsulfonate (specifically, trade name: Mesamoll (manufactured by LANXESS)); phosphate compounds such as tricresyl phosphate, tributyl phosphate and the like; trimellitate compound; chlorinated paraffin; hydrocarbon-based oil such as alkyl diphenyl, partially hydrogenated terphenyl and the like; process oil; epoxy plasticizer such as epoxydized soybean oil, benzyl epoxystearate and the like, and the like.

A high molecular weight plasticizer can also be used. When a high molecular weight plasticizer is used, the initial properties can be maintained for a long term as compared to the use of a low molecular weight plasticizer. In addition, drying performance (coatability) when alkyd paint is applied to a cured product can be improved. When a cured product having high strength is desired, a high molecular weight plasticizer is preferably used rather than a low molecular weight plasticizer. Specific examples of the high molecular weight plasticizer include, but are not limited to, (meth)acrylate-based polymer obtained by polymerizing (meth)acrylate monomer by various methods; polyalkyleneglycol esters such as diethylene glycol dibenzoate, triethylene glycol dibenzoate, pentaerythritol ester and the like; polyester-based plasticizer obtained from dibasic acid such as sebacic acid, adipic acid, azelaic acid, phthalic acid and the like and divalent alcohol such as ethylene glycol, diethylene glycol, triethylene glycol, propylene glycol, dipropyleneglycol and the like; polyetherpolyols having a number average molecular weight of not less than 500, further not less than 1,000, such as polyethylene glycol, polypropylene glycol, polytetramethyleneglycol and the like; polyether obtained by urethanating hydroxyl group of such polyetherpolyols (e.g., trade name: LBU-25 (manufactured by Sanyo Chemical Industries, Ltd.)), polyether obtained by esterification with carboxylic acid, polyether wherein the terminal is etherified; polystyrenes such as polystyrene, poly-α-methylstyrene and the like; polybutadiene, polybutene, polyisobutylene, butadiene-acrylonitrile, polychloroprene and the like.

Of these high molecular weight plasticizers, those compatible with polymers (A) and (B) are preferable. From such aspect, a polyether-based polymer and a (meth)acrylate-based polymer are preferable. In addition, a polyether-based polymer is preferably used as a plasticizer, since surface curability and depth curability are improved, and curing retardation after storage does not occur. Of these, polypropylene glycol is more preferable. A polyether derivative free of a hydroxy group on the terminal is preferably used, since a decrease in the strength due to the addition of a plasticizer can be suppressed. From the aspects of compatibility, weather resistance and heat resistance, a (meth)acrylate-based polymer is preferable. Of the (meth)acrylate-based polymers, poly(alkyl (meth)acrylate) is particularly preferable. As the synthesis method of the polymer, a living radical polymerization method is preferable, and an atom transfer radical polymerization method is more preferable, since the molecular weight distribution is narrow and low viscosity can be achieved. In addition, a polymer obtained by continuous bulk polymerization of alkyl (meth)acrylate-based monomer at a high temperature and high pressure, so-called SGO process, described in JP-A-2001-207157, is preferably used.

The number average molecular weight of a high molecular weight plasticizer is preferably 500 to 15,000, more preferably 800 to 10,000, further preferably 1,000 to 8,000, most preferably 1,000 to 5,000, based on the molecular weight of polystyrene by GPC. It is most preferably 1,000 to 3,000. When the molecular weight is too low, plasticizer flows out over time due to heat and rainfall, and the initial property cannot be maintained for a long term. When the molecular weight is too high, the viscosity becomes high to degrade workability.

The molecular weight distribution of high molecular weight plasticizer is not particularly limited, but preferably narrow. It is preferably less than 1.80, more preferably not more than 1.70, still more preferably not more than 1.60, more preferably not more than 1.50, particularly preferably not more than 1.40, most preferably not more than 1.30.

A high molecular weight plasticizer having a reactive silicon group may be used. As the reactive silicon group, a silicon group represented by the formula (1) can be mentioned. A reactive silicon group can be introduced by the methods exemplified for polymer (A) and polymer (B). While the reactive silicon groups of polymer (A) and high-molecular weight plasticizer may be different, they are preferably the same since a cured product having good elongation is obtained. The lower limit of the number of the reactive silicon groups is preferably not less than 0.3, more preferably not less than 0.5, particularly preferably not less than 0.6, on average per molecule. The upper limit is preferably not more than 1.0. The number of the reactive silicon group of not more than 0.3 is not preferable since high strength of a cured product may not be obtained. The number of the reactive silicon groups of higher than 1 is not preferable, since a cured product having high elongation may not be obtained.

The amount of the plasticizer to be used is preferably 5-150 parts by weight, more preferably 10-120 parts by weight, particularly preferably 20-100 parts by weight, per 100 parts by weight of the total content of polymers (A) and (B). When the content is less than 5 parts by weight, the effect of the plasticizer is not developed, and when it exceeds 150 parts by weight, the mechanical strength of a cured product is insufficient. The plasticizer may be used alone, or two or more kinds thereof may be used in combination. In addition, a low molecular weight plasticizer and a high molecular weight plasticizer may be used in combination. These plasticizers can also be added during production of polymer. When the curable composition is desired to develop high strength, use of a low-molecular weight plasticizer is desirably avoided.

The composition according to one or more embodiments of the present invention can contain a solvent or a diluent.

While the solvent and diluent are not particularly limited, aliphatic hydrocarbon, aromatic hydrocarbon, alicyclic hydrocarbon, halogenated hydrocarbon, alcohol, ester, ketone, ether and the like can be used. When the solvent or diluent is used, the boiling point of the solvent is preferably not less than 150° C., more preferably not less than 200° C., particularly preferably not less than 250° C., in view of the problem of air pollution during indoor use of the composition. Only one kind of the above-mentioned solvent and diluent may be used, or two or more kinds thereof may be used in combination.

The curable composition according to one or more embodiments of the present invention can contain a silane coupling agent, a reaction product of a silane coupling agent or a compound other than silane coupling agent as an adhesiveness-imparting agent. Specific examples of the silane coupling agent include isocyanate group-containing silanes such as γ-isocyanatepropyltrimethoxysilane, γ-isocyanatepropyltriethoxysilane, γ-isocyanatepropylmethyldiethoxysilane, γ-isocyanatepropylmethyldimethoxysilane, α-isocyanatemethyltrimethoxysilane, α-isocyanatemethyldimethoxymethylsilane and the like; amino group-containing silanes such as γ-aminopropyltrimethoxysilane, γ-aminopropyltriethoxysilane, γ-aminopropylmethyldimethoxysilane, γ-aminopropylmethyldiethoxysilane, N-β-aminoethyl-γ-aminopropyltrimethoxysilane, N-β-aminoethyl-γ-aminopropylmethyldimethoxysilane, N-β-aminoethyl-γ-aminopropyltriethoxysilane, N-β-aminoethyl-γ-aminopropylmethyldiethoxysilane, γ-ureidopropyltrimethoxysilane, N-phenyl-γ-aminopropyltrimethoxysilane, N-benzyl-γ-aminopropyltrimethoxysilane, N-vinylbenzyl-γ-aminopropyltriethoxysilane, (aminomethyl)dimethoxymethylsilane, (aminomethyl)trimethoxysilane, (phenylaminomethyl)dimethoxymethylsilane, (phenylaminomethyl)trimethoxysilane, bis(3-trimethoxysilylpropyl)amine and the like; mercapto group-containing silanes such as γ-mercaptopropyltrimethoxysilane, γ-mercaptopropyltriethoxysilane, γ-mercaptopropylmethyldimethoxysilane, γ-mercaptopropylmethyldiethoxysilane and the like; epoxy group-containing silanes such as γ-glycidoxy propyltrimethoxysilane, γ-glycidoxy propyltriethoxysilane, γ-glycidoxy propylmethyldimethoxysilane, β-(3,4-epoxycyclohexyl)ethyltrimethoxysilane, β-(3,4-epoxycyclohexyl)ethyltriethoxysilane and the like; carboxy silanes such as β-carboxyethyltriethoxysilane, β-carboxyethylphenylbis(β-methoxyethoxy)silane, N-β-(carboxymethyl)aminoethyl-γ-aminopropyltrimethoxysilane and the like; vinyl unsaturated group-containing silanes such as vinyltrimethoxysilane, vinyltriethoxysilane, γ-methacryloyloxypropylmethyldimethoxysilane, γ-acryloyloxypropyltriethoxysilane and the like; halogen-containing silanes such as γ-chloropropyltrimethoxysilane and the like; isocyanurate silanes such as tris(trimethoxysilyl)isocyanurate and the like; carbamate silanes such as methyl(N-dimethoxymethylsilylmethyl)carbamate, methyl(N-trimethoxysilylmethyl)carbamate, methyl(N-dimethoxymethylsilylpropyl)carbamate, methyl (N-trimethoxysilylpropyl)carbamate and the like; alkoxy group-containing silanes such as (methoxymethyl)dimethoxymethylsilane, (methoxymethyl)trimethoxysilane, (ethoxymethyl)trimethoxysilane, (phenoxymethyl) trimethoxysilane and the like; acid anhydride-containing silanes such as 3-(trimethoxysilyl)propylsuccinic anhydride, 3-(triethoxysilyl)propylsuccinic anhydride and the like, and the like. In addition, partially condensed products of these, and modified derivatives thereof such as amino-modified silyl polymer, silylated amino polymer, unsaturated aminosilane complex, phenylamino long-chain alkyl silane, aminosilylated silicone, silylated polyester and the like can also be used as silane coupling agents. These silane coupling agents may be used alone, or may be used in combination. Examples of the reaction product of the silane coupling agent include a reaction product of isocyanate silane and a hydroxy group-containing compound or an amino group-containing compound; Michael addition reaction product of aminosilane; a reaction product of aminosilane and an epoxy group-containing compound, a reaction product of epoxysilane and a carboxy group-containing compound, and amino group-containing compound and the like.

The amount of a silane coupling agent to be used is preferably 0.1-20 parts by weight, particularly preferably 0.5-10 parts by weight, per 100 parts by weight of polymer (A) and polymer (B).

Specific examples of the adhesiveness-imparting agent other than the silane coupling agent include, but are not particularly limited to, epoxy resin, phenol resin, sulfur, alkyl titanates, aromatic polyisocyanate and the like. The above-mentioned adhesiveness-imparting agent may be used alone, or two or more kinds thereof may be used concurrently. By adding these adhesiveness-imparting agents, the adhesiveness to an adherend can be improved.

In addition, the composition according to one or more embodiments of the present invention can contain silicate. The silicate acts as a crosslinking agent and has a function to improve recovery property, durability, and creep resistance of a cured product obtained from the curable composition according to one or more embodiments of the present invention. Furthermore, silicate also has an effect to improve the adhesiveness and water-resistant adhesiveness, as well as adhesion durability under high temperature and high humidity conditions. As silicate, tetraalkoxysilane and alkylalkoxysilane or a partially hydrolyzed condensate thereof can be used.

Specific examples of silicate include tetraalkoxysilanes (tetraalkyl silicates) and a partially hydrolyzed condensate thereof such as tetramethoxysilane, tetraethoxysilane, ethoxytrimethoxysilane, dimethoxydiethoxysilane, methoxytriethoxysilane, tetra-n-propoxysilane, tetra-i-propoxysilane, tetra-n-butoxy silane, tetra-i-butoxysilane, tetra-t-butoxysilane and the like, and the like.

The partially hydrolyzed condensate of tetraalkoxysilane is more preferable since it shows a greater improvement effect on the resilience, durability and creep resistance according to one or more embodiments of the present invention than with tetraalkoxysilane.

As the aforementioned partially hydrolyzed condensate of tetraalkoxysilane, for example, one obtained by adding water to tetraalkoxysilane to allow partial hydrolysis and then condensation thereof by a conventional method can be mentioned as an example. In addition, as the partially hydrolyzed condensate of organosilicate compound, a commercially available product can be used. As such condensates, for example, methyl silicate 51, ethyl silicate 40 (both manufactured by COLCOAT CO., LTD.) and the like can be mentioned as examples.

When silicate is used, the amount thereof to be used is 0.1-20 parts by weight, preferably 0.5-10 parts by weight, per 100 parts by weight of the total of polymers (A) and (B).

The curable composition according to one or more embodiments of the present invention can contain various fillers. Examples of the filler include fumed silica, precipitated silica, crystal silica, molten silica, dolomite, silicic anhydride, hydrous silicate, aluminum hydroxide, carbon black, hollow alumina silica fine particles (e.g., trade name: PANSIL UltraSpheres (manufactured by TOLSA)), heavy calcium carbonate, colloidal calcium carbonate, magnesium carbonate, diatomite, sintered clay, clay, talc, kaolinite, sillitin, titanium oxide, bentonite, organic bentonite, ferric oxide, aluminum fine powder, flint powder, zinc oxide, activated zinc oxide, resin powder such as PVC powder, PMMA1 powder and the like, fiber filler such as asbestos, glass fiber, and filament and the like.

The filler can be dried in advance by dehydration including, as described in JP-A-2001-181532, uniformly mixing the filler with a dehydrating agent such as oxidation calcium and the like, sealing the mixture in a bag made of an air-tight material, and leaving the bag for a suitable time period. Using this low water content filler, the storage stability of particularly a one-component composition can be improved.

In addition, when a highly transparent composition is to be obtained, a polymer powder made from a polymer such as methyl methacrylate and the like as a starting material, amorphous silica and the like can be used as a filler, as described in JP-A-11-302527. Furthermore, as described in JP-A-2000-38560, using hydrophobic silica which is a silicon dioxide fine powder having a hydrophobic group bonded on its surface and the like as a filler, a highly transparent composition can be obtained. While the surface of the silicon dioxide fine powder generally has a silanol group (—SiOH), by reacting the silanol group with an organic silicon halide, alcohol and the like, (—SiO-hydrophobic group) is produced to give hydrophobic silica. Specifically-recited is one wherein the silanol group present on the surface of silicon dioxide fine powder is reacted with dimethylsiloxane, hexamethyldisilazane, dimethyldichlorosilane, trimethoxyoctylsilane, trimethylsilane and the like to form a bond. The silicon dioxide fine powder having a surface formed by silanol group (—SiOH) is called hydrophilic silica fine powder.

When a cured product with a highly strength is desired by using these fillers, a filler selected from fumed silica, precipitated silica, crystal silica, molten silica, dolomite, silicic anhydride, hydrous silicate, carbon black, aluminum hydroxide, heavy calcium carbonate, sintered clay, clay, titanium oxide, silica-alumina ceramic filler, kaolinite, sillitin, activated zinc oxide and the like is preferable. The amount thereof to be used is preferably 1-200 parts by weight per 100 parts by weight of the total of polymers (A) and (B). In general, calcium carbonate having a greater specific surface area shows greater improving effect on the tensile strength at break, elongation at break and adhesiveness of the cured product. Therefore, the average primary particle size of heavy calcium carbonate is preferably less than 3 μm, more preferably less than 2 μm, most preferably less than 1 μm. The lower limit of the average primary particle size is preferably 0.05 μm. When calcium carbonate is used, each of surface-treated calcium carbonate and non-surface-treated calcium carbonate may be used singly, or used in combination. When an increase in the dispersibility of calcium carbonate is desired, a surface treatment is preferably applied, and when a cured product having high strength is desired, no surface treatment or a low level of a surface treatment is preferable. Examples of the surface treating agent for producing surface-treated calcium carbonate powder include, but are not limited to, carboxylic acid and ester thereof such as fatty acid or unsaturated fatty acid represented by palmitic acid, caprylic acid, capric acid, lauric acid, stearic acid, arachidic acid, behenic acid, lignoceric acid, oleic acid, linoleic acid, linolenic acid and the like, and rosin acid-based compound and the like, silane compounds such as hexamethyldisilazane, chlorosilane, aminosilane and the like, paraffin-based compound and the like. Of these, carboxylic acid is preferable as a surface treating agent, since curing retardation hardly occurs when a curable silicone composition is produced. Among carboxylic acids, saturated fatty acid and unsaturated fatty acid are particularly preferable, since curing retardation more hardly occurs. Only one kind of these fillers may be used, or two or more kinds thereof may be mixed and used. When a cured product having high strength is desired, heavy calcium carbonate is preferably used. When a cured product having high tear strength is desired, colloidal calcium carbonate is preferably used.

The amount of the filler to be used is preferably 1-300 parts by weight, particularly preferably 10-200 parts by weight, per 100 parts by weight in total of polymers (A) and (B).

To afford improved workability (releaseability and the like) of a composition and matte surface of the cured product, addition of organic balloon or inorganic balloon is preferable. Such fillers can be subjected to a surface treatment, only one kind thereof may be used, or two or more kinds thereof may be mixed and used. For improved workability (releaseability and the like), the particle size of the balloon is preferably not more than 0.1 mm. For matte surface of the cured product, it is preferably 5-300 μm.

The composition according to one or more embodiments of the present invention is preferably used as an adhesive for joint of exterior walls of housing such as sizing board, particularly ceramic sizing board, and the like, an adhesive for exterior wall tile, which remains in the joint, and the like, since chemical resistance of a cured product is good and the like. It is desirable to match the design of exterior wall and the design of the sealing material. Particularly, as an exterior wall, exterior walls with high grade by sputter coating, mixing with colored aggregate and the like are being used. When the composition according to one or more embodiments of the present invention contains a scale-like or granular substance having a diameter of not less than 0.1 mm, preferably about 0.1-5.0 mm, the composition becomes superior, since a cured product matches with such high grade exterior walls and shows superior chemical resistance, and therefore, the appearance of the cured product is maintained for a long term. When a granular substance is used, the surface has a sanding-look or sandstone-look texture, and when a scale-like substance is used, the surface becomes a concavo-convex surface due to the scale-like substance.

Preferable diameter, the amount, material and the like of the scale-like or granular substance are as follows as described in JP-A-9-53063.

The diameter is not less than 0.1 mm, preferably about 0.1-5.0 mm, and one having a suitable size is used according to the material, pattern and the like of the exterior wall. A substance of about 0.2 mm-5.0 mm or about 0.5 mm-5.0 mm can also be used. A scale-like substance has a thickness of about 1/10-1/5 of the diameter (about 0.01-1.00 mm). A scale-like or granular substance is mixed with the main sealing components in advance and delivered as a sealing material to the construction site, or mixed with the main sealing components on the construction site when in use.

The scale-like or granular substance is added at 1-200 parts by weight per 100 parts by weight of a composition such as a sealing material composition, an adhesive composition and the like. The amount is appropriately determined according to the size of individual scale-like or granular substances, and material, pattern and the like of the exterior wall.

As a scale-like or granular substance, naturally occurring substances such as silica sand, mica and the like, synthetic rubber, synthetic resin, inorganic materials such as alumina and the like are used. To enhance the design aspect when filled in a joint, it is painted in a suitable color according to the material, pattern and the like of the exterior wall.

Preferable finishing method and the like are described in JP-A-9-53063.

For a similar object, a balloon (preferably having an average particle size of not less than 0.1 mm) is used to provide a surface with a sanding-look or sandstone-look texture, as well as reduce the weight. Preferable diameter, the amount, material and the like of balloon are as described in JP-A-10-251618.

The balloon is a spherical filler with a hollow inside. The balloon can be added for weight saving (density saving) of the composition. Examples of the material of the balloon include, but are not limited to, inorganic materials such as glass, white sand, silica and the like, and organic materials such as phenol resin, urea resin, polystyrene, saran and the like. It is also possible to use a composite of an inorganic material and an organic material, or form multiple layers by lamination. An inorganic or organic balloon, or a composite of these balloons and the like can be used. The balloon to be used may be the same or plural kinds of balloons made of different kinds of materials may be used without any problem. Furthermore, a balloon having a processed or coated surface can also be used. In addition, a balloon having a surface treated with various kinds of surface treating agents can also be used. For example, an organic balloon coated with calcium carbonate, talc, titanium oxide and the like and an inorganic balloon surface-coated with a silane coupling agent and the like can be mentioned.

To afford a surface with a sanding-look or sandstone-look texture, the balloon preferably has a particle size of not less than 0.1 mm. A balloon of a size of about 0.2 mm-5.0 mm or about 0.5 mm-5.0 mm can also be used. When the size is less than 0.1 mm, the viscosity of the composition is sometimes increased without providing the texture, even when added in a large amount. The amount of the balloon can be easily determined according to the degree of a desired sanding-look or sandstone-look texture. Generally, it is desirable to add balloon having a particle size of not less than 0.1 mm at a volume concentration of 5-25 vol % in the composition. When the volume concentration of the balloon is less than 5 vol %, the texture is absent, and when it exceeds 25 vol %, the viscosity of sealing material and adhesive becomes high, workability becomes poor, modulus of a cured product also becomes high, and the basic property of sealing material and adhesive tends to be impaired. A volume concentration affording a particularly preferable balance with the basic property of the sealing material is 8-22 vol %.

When a balloon is used, a slip preventive described in JP-A-2000-154368, and amidine compound described in JP-A-2001-164237, which affords a matte, in addition to convex-concave state, surface of a cured product, particularly primary and/or secondary amine having a melting point of not less than 35° C., can be added.

Specific examples of the balloon are shown in publications such as JP-A-2-129262, JP-A-4-8788, JP-A-4-173867, JP-A-5-1225, JP-A-7-113073, JP-A-9-53063, JP-A-10-251618, JP-A-2000-154368, JP-A-2001-164237, WO97/05201 and the like.

In addition, thermally expandable hollow body described in JP-A-2004-51701, JP-A-2004-66749 and the like can be used. The thermally expandable hollow body is a plastic sphere obtained by enclosing a low boiling point compounds such as hydrocarbon having 1 to 5 carbon atoms and the like with a polymer outer shell material (vinylidene chloride-based copolymer, acrylonitrile-based copolymer, or vinylidene chloride-acrylonitrile copolymer) in spheres. When the area of adhesion of this composition is heated, the gas pressure in the shell of the thermally expandable hollow body increases, and the polymer outer shell material is softened to strikingly increase the volume thereof, which plays a role of detaching the curable product adhered to the object. By adding thermally expandable hollow granules, an adhesive composition that permits easy detachment by heating alone when unnecessary, without accompanying material destruction, and capable of detachment by heating, without using an organic solvent at all, can be obtained.

Even when the composition according to one or more embodiments of the present invention contains cured product particles for a sealing material, the cured product forms concaves and convexes on the surface thereof and improve the design. The preferable diameter, amount to be added, material and the like of the cured product particles for a sealing material are described in JP-A-2001-115142 as follows. The diameter thereof is preferably 0.1 mm-1 mm, further preferably about 0.2-0.5 mm. The amount thereof in a curable composition is preferably 5-100 wt %, more preferably 20-50 wt %. While the material thereof is not limited as long as it can be used as a sealing material, it includes, for example, urethane resin, silicone, modified silicone, polysulfide rubber and the like, with preference given to modified silicone.

The amount of the spherical hollow body to be used is preferably 0.01-30 parts by weight, more preferably 0.1-20 parts by weight, per 100 parts by weight of the total content of polymers (A) and (B). When the content is less than 0.01 part by weight, the workability-improving effect is absent, and when it exceeds 30 parts by weight, elongation and breaking strength of a cured product tend to be low.

The curable composition according to one or more embodiments of the present invention may contain an anti-sagging agent, as necessary, to prevent sagging and improve workability. While the anti-sagging agent is not particularly limited, for example, polyamide wax; hydrogenated castor oil derivatives; metal soaps such as calcium stearate, aluminum stearate, barium stearate and the like, and the like can be mentioned as examples. When a rubber powder having a particle size of 10-500 μm as described in JP-A-11-349916 or an organic fiber as described in JP-A-2003-155389 is used, a composition showing high thixotropy and good workability can be obtained. Such anti-sagging agent may be used alone, or two or more kinds thereof may be used in combination.

The amount of the anti-sagging agent to be used is preferably 0.1-20 parts by weight per 100 parts by weight of the total of polymers (A) and (B).

The curable composition according to one or more embodiments of the present invention can contain an antioxidant (anti-aging agent). When an antioxidant is used, weather resistance of a cured product can be enhanced. Examples of the antioxidant include hindered phenol-based antioxidant, monophenol-based antioxidant, bisphenol-based antioxidant, and polyphenol-based antioxidant, and hindered phenol-based antioxidant is particularly preferable. Similarly, hindered amine photostabilizer such as Tinuvin 622 LD, Tinuvin 144; CHIMASSORB944LD, CHIMASSORB119FL (each of the above manufactured by Ciba Japan K.K.); Adekastab LA-57, LA-62, LA-67, LA-63, LA-68 (each of the above is manufactured by ADEKA CORPORATION); Sanol LS-770, LS-765, LS-292, LS-2626, LS-1114, LS-744 (each of the above is manufactured by Sankyo Lifetech Co., Ltd.), and the like can also be used. Specific examples of the antioxidant are also recited in JP-A-4-283259 and JP-A-9-194731.

The amount of the antioxidant to be used is preferably 0.1-10 parts by weight, particularly preferably 0.2-5 parts by weight, per 100 parts by weight of the total of polymers (A) and (B).

The curable composition according to one or more embodiments of the present invention can contain a light stabilizer. Use of a light stabilizer prevents degradation of a cured product due to photooxidation. Examples of the light stabilizer include benzotriazole-based, hindered amine-based, benzoate-based compounds and the like, and a hindered amine-based one is particularly preferable.

The amount of the light stabilizer to be used is preferably 0.1-10 parts by weight, particularly preferably 0.2-5 parts by weight, per 100 parts by weight of the total of polymers (A) and (B).

When a photocurable substance, particularly an unsaturated acrylic compound, is added to the curable composition according to one or more embodiments of the present invention, a tertiary amine-containing hindered amine-based light stabilizer is preferably used as a hindered amine-based light stabilizer, as described in JP-A-5-70531, to improve preservation stability of the curable composition. Examples of the tertiary amine-containing hindered amine-based light stabilizer include light stabilizers such as Tinuvin 622 LD, Tinuvin 144; CHIMASSORB119FL (each of the above manufactured by Ciba Japan K.K.); Adekastab LA-57, LA-62, LA-67, LA-63 (each of the above is manufactured by ADEKA CORPORATION); Sanol LS-765, LS-292, LS-2626, LS-1114, LS-744 (each of the above is manufactured by Sankyo Lifetech Co., Ltd.), and the like.

In the curable composition according to one or more embodiments of the present invention, a UV absorber can be used. When a UV absorber is used, weather resistance of the surface of a cured product can be enhanced. Examples of the UV absorber include benzophenone-based, benzoate-based, benzotriazole-based, salicylate-based, substituted tolyl-based and metal chelate-based compounds and the like. Of these, benzotriazole-based one is particularly preferable. Examples thereof include trade name Tinuvin P, Tinuvin 213, Tinuvin 234, Tinuvin 326, Tinuvin 327, Tinuvin 328, Tinuvin 329, and Tinuvin 571 (each of the above manufactured by BASF). Particularly preferred is a 2-(2H-1,2,3-benzotriazol-2-yl)-phenol-based compound. Furthermore, a combined use of a phenol-based antioxidant and/or a hindered phenol-based antioxidant, and a hindered amine-based light stabilizer, and a benzotriazole-based UV absorber is preferable.

The amount of the UV absorber to be used is preferably 0.1-10 parts by weight, particularly preferably 0.2-5 parts by weight, per 100 parts by weight of the total of polymers (A) and (B).

The curable composition according to one or more embodiments of the present invention may contain various additives as necessary to adjust various properties of a curable composition or a cured product. Examples of such additive include flame-retardant, curability adjusting agent, radical inhibitor, metal deactivator, antiozonant, phosphorus peroxide decomposer, lubricant, pigment, blowing agent, solvent, fungicide and the like. Only one kind of these various additives may be used, or two or more kinds thereof may be used in combination. Specific examples of the additive other than those recited in this specification are recited in publications such as JP-B-4-69659, JP-B-7-108928, JP-A-63-254149, JP-A-64-22904, JP-A-2001-72854 and the like.

The curable composition according to one or more embodiments of the present invention can also be prepared as a one-component type to be cured by moisture in the air after application by previously blending all components to be blended, and preserving same after tightly sealing. In addition, it can also be prepared as a two-component type to be used by mixing a curing agent containing a curing agent containing components such as curing catalyst, filler, plasticizer, water and the like, which is prepared separately, and a polymer composition before use.

When the curable composition is a one-component type, all components to be blended are blended in advance. Therefore, components containing moisture to be blended are preferably dehydrated and dried before use, or dehydrated during kneading under reduced pressure and the like. When the above-mentioned curable composition is a two-component type, a curing catalyst does not need to be added to a main agent containing a polymer having a reactive silicon group. Therefore, even when components to be blended contain some moisture, gelation is not feared; however, when storage stability over a long term is necessary, components to be blended are preferably dehydrated and dried. When components to be blended are solid such as powder and the like, a dehydrating and drying method is preferably a heat drying method, and when components to be blended are liquid, a reduced pressure dehydrating method, or a dehydrating method using synthesis zeolite, activated alumina, silica gel and the like is preferable. In addition, it is possible to perform dehydration by adding a small amount of an isocyanate compound to the components to be blended to allow for a reaction of the isocyanate group and water. The storage stability is further improved by adding lower alcohol such as methanol, ethanol and the like; alkoxysilane compounds such as n-propyltrimethoxysilane, vinyltrimethoxysilane, vinylmethyldimethoxysilane, γ-mercaptopropylmethyldimethoxysilane, γ-mercaptopropylmethyldiethoxysilane, γ-glycidoxypropyltrimethoxysilane and the like in addition to the dehydrating and drying method.

The amount of a dehydrating agent, particularly, a silicon compound capable of reacting with water such as vinyltrimethoxysilane and the like is preferably 0.1-20 parts by weight, particularly preferably 0.5-10 parts by weight, per 100 parts by weight of the total of polymers (A) and (B).

The curable composition according to one or more embodiments of the present invention may contain a physical property modifier, as necessary, that controls the tensile property of the obtained cured product. While the physical property modifier is not particularly limited, for example, alkylalkoxysilanes such as phenoxytrimethylsilane, methyltrimethoxysilane, dimethyldimethoxysilane, trimethylmethoxysilane, n-propyltrimethoxysilane and the like; arylalkoxysilanes such as diphenyldimethoxysilane, phenyltrimethoxysilane and the like; alkylisopropenoxysilanes such as dimethyldiisopropenoxysilane, methyltriisopropenoxysilane, γ-glycidoxypropylmethyldiisopropenoxysilane and the like; trialkylsilyl borates such as tris(trimethylsilyl) borate, tris(triethylsilyl) borate and the like; silicone varnish; polysiloxanes and the like can be mentioned. Using the physical property modifier, the hardness of the composition according to one or more embodiments of the present invention after curing may be increased or conversely decreased to improve elongation at break. Only one kind of the above-mentioned physical property modifier may be used, or two or more kinds thereof may be used in combination.

Particularly, a compound that forms a compound having a monovalent silanol group in a molecule by hydrolysis decreases the modulus of the cured product without worsening the stickiness of the surface of the cured product. Particularly, a compound forming trimethylsilanol is preferable. As a compound that forms a compound having a monovalent silanol group in a molecule by hydrolysis, a compound described in JP-A-5-117521 can be mentioned as an example. In addition, a compound that forms a silicon compound that forms $R_3SiOH$ such as trimethylsilanol and the like by hydrolysis, which is a derivative of alkyl alcohol such as hexanol, octanol, decanol and the like, a compound that forms a silicon compound that forms $R_3SiOH$ such as trimethylsilanol and the like by hydrolysis, which is a derivative of polyvalent alcohol having not less than 3 hydroxy groups, such as trimethylolpropane, glycerol, pentaerythritol, sorbitol and the like as described in JP-A-11-241029 can be mentioned as examples.

Moreover, a compound that forms a silicon compound that forms $R_3SiOH$ such as trimethylsilanol and the like by hydrolysis, which is a derivative of an oxypropylene polymer described in JP-A-7-258534 can be mentioned as an example. Furthermore, polyoxypropylene polymer having a crosslinkable hydrolyzable silicon group and a silicon group, which can be a monosilanol-containing compound by hydrolysis as described in JP-A-6-279693 can also be used.

In one or more embodiments of the present invention, a tackifier resin can be added as necessary to enhance adhesiveness and close adhesiveness to a substrate or other purposes. The tackifier resin is not particularly limited, and one generally used can be used. Examples thereof include terpene-based resin, aromatic modified terpene resin, hydrogenated terpene resin obtained by hydrogenating same, terpene-phenol resin obtained by copolymerizing terpenes with phenols, phenol resin, modified phenol resin, xylene-phenol resin, cyclopentadiene-phenol resin, coumarone-indene resin, rosin resin, rosin ester resin, hydrogenated rosin ester resin, xylene resin, low-molecular weight polystyrene-based resin, styrene copolymer resin, petroleum resin (e.g., C5 hydrocarbon resin, C9 hydrocarbon resin, C5C9 hydrocarbon copolymer resin etc.), hydrogenated petroleum resin, DCPD resin and the like. These may be used alone, or two or more kinds thereof may be used in combination.

The styrene block copolymer and a hydrogenated product thereof are not particularly limited, and examples thereof include styrene-butadiene-styrene block copolymer (SBS), styrene-isoprene-styrene block copolymer (SIS), styrene-ethylenebutylene-styrene block copolymer (SEBS), styrene-ethylenepropylene-styrene block copolymer (SEPS), styrene-isobutylene-styrene block copolymer (SIBS) and the like.

Of these, terpene-phenol resin is preferable since it shows high compatibility with polymers (A) and (B) and affords highly close adhering effect. On the other hand, when color tone is important, a hydrocarbon resin is preferable.

The amount of the tackifier resin to be used is preferably 2-100 parts by weight, more preferably 5-50 parts by weight, further preferably 5-30 parts, per 100 parts by weight of the total content of polymer (A) and polymer (B). When the content is less than 2 parts by weight, an adhesion and close adhesion effect to a substrate is difficult to obtain, and when it exceeds 100 parts by weight, viscosity of a curable composition sometimes becomes too high and handling becomes difficult.

An epoxy group-containing compound can be used for the composition according to one or more embodiments of the present invention. By the use of a compound containing an epoxy group, the recovery property of the cured product can be increased. As a compound containing an epoxy group, epoxydized unsaturated fats and oils, epoxydized unsaturated fatty acid esters, alicyclic epoxy compounds, compounds shown as epichlorohydrin derivative and mixtures thereof and the like can be mentioned as examples. Specifically, epoxydized soy bean oil, epoxydized linseed oil, bis(2-ethylhexyl)-4,5-epoxycyclohexane-1,2-dicarboxylate (E-PS), epoxyoctyl stearate, epoxybutyl stearate and the like can be mentioned as examples. Of these, E-PS is particularly preferable. An epoxy compound is preferably used in an amount of 0.5-50 parts by weight per 100 parts by weight of the total content of polymers (A) and (B).

A photocurable substance can be used for the composition according to one or more embodiments of the present invention. When a photocurable substance is used, a film of the photocurable substance is formed on the surface of the cured product, the stickiness and weather resistance of the cured product can be improved. The photocurable substance is one that shows chemical changes of the molecular structure in a considerably short time and produces physical changes such as curing by the action of light. As such kinds of compounds, many are known such as organic monomer, oligomer, resin, compositions containing same and the like, and any commercially available one can be employed. Representative ones include unsaturated acrylic compound, polyvinyl cinnamate, azide resin and the like. Examples of unsaturated acrylic compound include monomer, oligomer or a mixture thereof, having one to several acrylic or methacrylic unsaturated groups, for example, propylene(or butylene, ethylene)glycol di(meth)acrylate, neopentylglycol di(meth)dimethacrylate and the like monomer and oligoester having a molecular weight of not more than 10,000. Specific examples include special acrylate (bifunctional) Aronix M-210, Aronix M-215, Aronix M-220, Aronix M-233, Aronix M-240, Aronix M-245; (trifunctional) Aronix M305, Aronix M-309, Aronix M-310, Aronix M-315, Aronix M-320, Aronix M-325, and (multifunctional) Aronix M-400 and the like. Particularly, compound containing an acrylic functional group is preferable, and a compound containing 3 or more, same functional groups on average in one molecule is preferable (each Aronix recited above is a product of Toagosei Co., Ltd.).

Examples of polyvinyl cinnamate include a photosensitive resin having a cinnamoyl group as a photosensitive group, wherein polyvinyl alcohol is esterified by cinnamic acid, and many other polyvinyl cinnamate derivatives. Azide resin is known to be a photosensitive resin containing an azido group as a photosensitive group, and it is generally a rubber photosensitive liquid containing a diazide compound as a photosensitizer. Detailed examples are disclosed in "Photosensitive Resin" (Insatsu Gakkai Shuppanbu Ltd., page 93-, page 106-, page 117-, Mar. 17, 1972), and these can be used singly or mixed and added with a sensitizer as necessary and used. When a sensitizer such as ketones, nitro compound and the like or a promoter such as amines and the like is added, the effect is sometimes enhanced. The amount of the photocurable substance to be used is preferably 0.1-20 parts by weight, more preferably 0.5-10 parts by weight, per 100 parts by weight of the total content of polymers (A) and (B). When the amount is not more than 0.1 part by weight, the weather resistance is not enhanced, and when the amount is not less than 20 parts by weight, the cured product becomes too hard and tends to crack.

The composition according to one or more embodiments of the present invention can contain an oxygen curable substance. As the oxygen curable substance, an unsaturated compound reactive with oxygen in the air can be mentioned as an example. It reacts with oxygen in the air, forms a cured film near the surface of the cured product and prevents stickiness of the surface and attachment of dust and dirt to the surface of the cured product. Examples of the oxygen curable substance include dry oil such as tung oil, linseed oil and the like, various alkyd resins obtained by modifying dry oil; acrylic polymer, epoxy resin and silicone resin, each modified by dry oil; liquid diene polymers such as 1,2-polybutadiene, 1,4-polybutadiene, C5-C8 diene polymer and the like obtained by polymerization or copolymerization of diene compounds such as butadiene, chloroprene, isoprene, 1,3-pentadiene and the like; liquid copolymers such as NBR, SBR and the like obtained by copolymerization of monomers such as acrylonitrile, styrene and the like, which are copolymerizable with these diene compounds, such that the diene compound becomes the main component, modified products of the above-mentioned liquid polymer (maleic modified products, boil oil modified products and the like) and the like. They may be used alone, or two or more kinds thereof may be used in combination. Of these, tung oil and liquid diene polymer are preferable. In addition, a combined use of a catalyst promoting the oxidation curing reaction or a metal dryer and an oxygen curable substance may enhance the effect thereof. As such catalyst and metal dryer, metal salts such as cobalt naphthenate, lead naphthenate, zirconium naphthenate, cobalt octylate, zirconium octylate and the like, amidine compound and the like can be mentioned as examples. When an oxygen curable substance is used, its content is preferably 0.1-20 parts by weight, more preferably 0.5-10 parts by weight, per 100 parts by weight of the total content of polymer (A) and polymer (B). When the aforementioned content is less than 0.1 part by weight, improvement of staining property of the surface of the cured product becomes insufficient, and when it exceeds 20 parts by weight, the tensile property and the like of the cured product tend to be impaired. As described in JP-A-3-160053, the oxygen curable substance is preferably used in combination with a photocurable substance.

The composition according to one or more embodiments of the present invention can contain an epoxy resin. A curable composition containing an epoxy resin is particularly preferable as an adhesive, especially an adhesive for exterior wall tiles. Examples of the epoxy resin include, but are not limited to, flame-retardant epoxy resins such as epichlorohydrin-bisphenol A epoxy resin, epichlorohydrin-bisphenol F epoxy resin, tetrabromobisphenol A glycidyl ether and the like, novolac epoxy resin, hydrogenated bisphenol A epoxy resin, glycidyl ether epoxy resin of bisphenol A propylene oxide addition product, p-oxybenzoic acid glycidyl ether ester epoxy resin, m-aminophenol-based epoxy resin, diaminodiphenylmethane-based epoxy resin, urethane modified epoxy resin, various kinds of alicyclic epoxy resins, N,N-diglycidyl aniline, N,N-diglycidyl-o-toluidine, triglycidyl isocyanurate, polyalkylene glycol diglycidyl ether, glycidyl ethers of polyvalent alcohol such as glycerol and the like, hydantoin epoxy resin, epoxy product of unsaturated polymers such as petroleum resin and the like, and the like. Conventional epoxy resins can be used. One containing at least two epoxy groups in a molecule is preferable, since it shows high reactivity during curing, and a cured product easily forms a three-dimensional network and the like. More preferred are bisphenol A type epoxy resins or novolac type epoxy resin and the like. The ratio (weight ratio) of these epoxy resins to be used is polymer (A+B)/epoxy resin=100/1-1/100. When the ratio of polymer (A+B)/epoxy resin is less than 1/100, an improving effect on the impact strength and toughness by the epoxy resin cured product is difficult to obtain, and when the ratio of polymer (A+B)/epoxy resin exceeds 100/1, the strength of the polymer cured product becomes insufficient. A preferable use ratio cannot be determined unconditionally, since it varies depending on the use of a curable resin composition and the like. For example, when impact resistance, flexibility, toughness, peel strength and the like of an epoxy resin cured product are improved, polymers (A) and (B) are preferably used at 1-100 parts by weight, more preferably 5-100 parts by weight, per 100 parts by weight of epoxy resin. On the other hand, when the strength of a cured product is to be improved, 1-200 parts by weight, more preferably 5-100 parts by weight, of an epoxy resin is used relative to 100 parts by weight in total of polymers (A) and (B).

When an epoxy resin is added, the composition according to one or more embodiments of the present invention can naturally contain a curing agent for curing the epoxy resin for combined use. A usable curing agent for epoxy resin is not particularly limited, and a conventionally-used curing agent for epoxy resin can be used. Specific examples thereof include, but are not limited to, primary or secondary amines such as triethylenetetramine, tetraethylenepentamine, diethylaminopropylamine, N-aminoethylpiperidine, m-xylylenediamine, m-phenylenediamine, diaminodiphenylmethane, diaminodiphenylsulfone, isophoronediamine, amine terminal polyether and the like; tertiary amine and these salts such as 2,4,6-tris(dimethylaminomethyl)phenol, tripropylamine and the like; polyamide resins; imidazoles; dicyanodiamides; boron trifluoride complex compounds; carboxylic anhydrides such as phthalic anhydride, hexahydrophthalic anhydride, tetrahydrophthalic anhydride, dodecinyl succinic anhydride, pyromellitic anhydride, chlorendic anhydride and the like; alcohols; phenols; carboxylic acids; compounds such as diketone complex compound of aluminum or zirconium and the like. The curing agent may be used alone, or two or more kinds thereof may be used in combination.

When a curing agent for epoxy resin is used, the amount thereof to be used is preferably 0.1-300 parts by weight per 100 parts by weight of the epoxy resin.

As a curing agent of an epoxy resin, ketimine can be used. Ketimine is stably present in a state free of moisture, and decomposed into primary amine and ketone by reacting with moisture, and the resulting primary amine is a room temperature-curable curing agent for the epoxy resin. Use of ketimine affords a one-component composition. Such ketimine can be obtained by the condensation reaction of an amidine compound and a carbonyl compound.

For the synthesis of ketimine, known amidine and carbonyl compounds may be used. For example, as amidine compound, diamines such as ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, p-phenylenediamine, p,p'-biphenylenediamine and the like; polyvalent amines such as 1,2,3-triaminopropane, triaminobenzene, tris(2-aminoethyl)amine, tetra(aminomethyl)methane and the like; polyalkylenepolyamines such as diethylenetriamine, triethylenetriamine, tetraethylenepentamine and the like; polyoxyalkylene-based polyamine; aminosilanes such as γ-aminopropyltriethoxysilane, N-(β-aminoethyl)-γ-aminopropyltrimethoxysilane, N-(β-aminoethyl)-γ-aminopropylmethyldimethoxysilane and the like; and the like can be used. As the carbonyl compound, aldehydes such as acetaldehyde, propionaldehyde, n-butylaldehyde, isobutylaldehyde, diethylacetoaldehyde, glyoxal, benzaldehyde and the like; cyclic ketones such as cyclopentanone, trimethylcyclopentanone, cyclohexanone, trimethylcyclohexanone and the like; aliphatic ketones such as acetone, methyl ethyl ketone, methyl propyl ketone, methyl isopropyl ketone, methyl isobutyl ketone, diethyl ketone, dipropyl ketone, diisopropyl ketone, dibutyl ketone, diisobutyl ketone and the like; β-dicarbonyl compounds such as acetylacetone, methyl acetoacetate, ethyl acetoacetate, dimethyl malonate, diethyl malonate, methyl ethyl malonate, dibenzoylmethane and the like; and the like can be mentioned.

When an imino group is present in ketimine, the imino group may be reacted with styrene oxide; glycidyl ethers such as butylglycidyl ether, allyl glycidyl ether and the like; glycidyl ester and the like. The ketimine may be used alone, or two or more kinds thereof may be used in combination. When ketimine is used, the amount thereof is 1-100 parts by weight per 100 parts by weight of the epoxy resin, where the amount of use varies depending on the kind of epoxy resin and ketimine.

The curable composition according to one or more embodiments of the present invention can contain a flame-retardant such as a phosphorus plasticizer such as ammonium polyphosphate, tricresyl phosphate and the like, and aluminum hydroxide, magnesium hydroxide, and thermally expandable black lead and the like. The above-mentioned flame-retardant may be used alone, or two or more kinds thereof may be used in combination.

A flame-retardant is used at 5-200 parts by mass, preferably 10-100 parts by mass, per 100 parts by mass of the total content of polymers (A) and (B).

The curable composition according to one or more embodiments of the present invention may contain various additives as necessary to adjust various properties of a curable composition or a cured product. Examples of such additive include curability adjusting agent, radical inhibitor, metal deactivator, antiozonant, phosphorus peroxide decomposer, lubricant, pigment, blowing agent, fungicide and the like. Only one kind of these various additives may be used, or two or more kinds thereof may be used in combination. Specific examples of the additive other than those recited in this specification are recited in publications such as JP-B-4-69659, JP-B-7-108928, JP-A-63-254149, JP-A-64-22904, JP-A-2001-72854 and the like.

The curable composition according to one or more embodiments of the present invention can also be prepared as a one-component type to be cured by moisture in the air after application by previously blending all components to be blended, and preserving same after tightly sealing. In addition, it can also be prepared as a two-component type to be used by mixing a curing agent containing a curing agent containing components such as curing catalyst, filler, plasticizer, water and the like, which is prepared separately, and a polyoxyalkylene-based polymer composition before use. In view of workability, a one-component composition is preferable When the above-mentioned curable composition is a one-component type, all components to be blended are blended in advance. Therefore, components containing moisture to be blended are preferably dehydrated and dried before use, or dehydrated during kneading under reduced pressure and the like. When the above-mentioned curable composition is a two-component type, a curing catalyst does not need to be added to a main agent containing a polyoxyalkylene-based polymer having a reactive silicon group. Therefore, even when components to be blended contain some moisture, gelation is not feared; however, when storage stability over a long term is necessary, components to be blended are preferably dehydrated and dried. When components to be blended are solid such as powder and the like, a dehydrating and drying method is preferably a heat drying method, and when components to be blended are liquid, a reduced pressure dehydrating method, or a dehydrating method using synthesis zeolite, activated alumina, silica gel and the like is preferable. In addition, it is possible to perform dehydration by adding a small amount of an isocyanate compound to the components to be blended to allow for a reaction of the isocyanate group and water. The storage stability is further improved by adding lower alcohol such as methanol, ethanol and the like; alkoxysilane compounds such as n-propyltrimethoxysilane, vinyltrimethoxysilane, vinylmethyldimethoxysilane, γ-mercaptopropylmethyldimethoxysilane, γ-mercaptopropylmethyldiethoxysilane, γ-glycidoxypropyltrimethoxysilane and the like in addition to the dehydrating and drying method.

The amount of a dehydrating agent, particularly silicon compounds capable of reacting with water such as vinyltrimethoxysilane and the like, to be used is 0.1-20 parts by weight, preferably 0.5-10 parts by weight, per 100 parts by weight in total of polymers (A) and (B).

The production method of the curable composition according to one or more embodiments of the present invention is not particularly limited. The curable composition according to one or more embodiments of the present invention can be produced by a conventional method including blending the above-mentioned components, kneading the mixture in a mixer, roll, kneader and the like at ambient temperature or a method including dissolving the above-mentioned components in a small amount of a solvent and mixing same.

The curable composition according to one or more embodiments of the present invention can be used as a pressure-sensitive adhesive, a sealing material for structures, boats and ships, automobiles, roads and the like, adhesive, blocking agent, insulation, vibration damper, acoustic insulation, foamed material, paint, spraying material, coating film waterproofing agent and the like. Since a cured product obtained by curing the curable composition according to one or more embodiments of the present invention is low viscous and superior in workability, it characteristically has high strength and high elongation, and is more preferably used as a sealing material, an adhesive or a coating film-waterproofing agent, from among those.

In addition, it can be used for various uses including electric or electronic component materials such as solar battery rear surface sealant and the like, electrical insulating materials such as insulation covering material for electric wire or cable and the like, elastic adhesive, contact-type adhesive, spray-type sealing material, crack repairing material, tiling adhesive, powder coating, casting material, medical rubber material, medical adhesive, medical equipment sealing material, food packaging material, joint sealing material for jacket material such as sizing board and the like, coating material, primer, conductive material for shielding electromagnetic wave, thermally conductive material, hot melt material, electric/electronic potting agent, film, gasket, various molding material, as well as rustproof or waterproof sealing material for wire glass or laminate glass end surface (cut section), liquid sealant used for automobile parts, electric parts, various machine components and the like, and the like. Moreover, since it can be closely adhered to a wide range of substrates such as glass, porcelain, wood, metal, resin molded products and the like by itself or with the aid of a primer, it can also be used as various types of tight-sealing composition or adhesive composition. Furthermore, since the curable composition according to one or more embodiments of the present invention can be used as adhesive for interior panels, adhesive for exterior panels, tiling adhesive, stone finishing adhesive, ceiling finishing adhesive, floor finishing adhesive, wall finishing adhesive, vehicle paneling adhesive, electric or electronic or precision equipment assembly adhesive, sealing material for direct glazing, multi-layer glass sealing material, SSG method sealing material, or structure working joint sealing material.

EXAMPLES

Embodiments of the present invention are explained in more detail in the following by referring to specific Examples, which are not to be construed as limitative.

Synthetic Example 1

Propylene oxide was polymerized using polyoxypropylene diol having a molecular weight of about 2,000 as an initiator and zinc hexacyanocobaltate glyme complex as a catalyst to give polyoxypropylene diol having a number average molecular weight of about 28,500 (based on molecular weight of polystyrene measured using HLC-8120GPC manufactured by Tosoh Corporation as a solution delivery system, TSK-GEL H type manufactured by Tosoh Corporation as a column, and THF as a solvent). Then, a methanol solution containing 1.0 molar equivalent of NaOMe relative to the hydroxy group of polyoxypropylene having hydroxy group on the terminus was added, methanol was evaporated, then 1.0 equivalent of allyl glycidyl ether was added and the mixture was reacted at 130° C. for 2 hr. Then, a methanol solution containing 0.28 equivalent of sodium methoxide was added, methanol was removed, and 1.79 molar equivalents of 3-chloro-1-propene was added to convert the terminus hydroxy group to an allyl group. Unreacted allyl chloride was removed by evaporation under reduced pressure. Then, n-hexane (300 parts by weight) and water (300 parts by weight) were mixed and stirred with 100 parts by weight of the obtained unrefined allyl group terminal polyoxypropylene, and water was removed by centrifugation. Water (300 parts by weight) was further mixed and stirred with the obtained hexane solution, water was removed by centrifugation again, and hexane was removed by degassing under reduced pressures. As a result, polyoxypropylene polymer having 2.0 carbon-carbon unsaturated bonds on average on one terminal portion was obtained. Then, 36 ppm of a platinum divinyldisiloxane complex (3 wt % isopropanol solution based on platinum) was added per 100 parts by weight of the obtained polymer, and 1.9 parts by weight of dimethoxysilane was slowly added dropwise with stirring. The mixed solution was reacted at 90° C. for 2 hr, and the unreacted dimethoxymethylsilane was evaporated under reduced pressure to give linear reactive silicon group-containing polyoxypropylene polymer (A-1) having 1.6 dimethoxymethylsilyl group on average on one terminal portion, 3.2 silicon groups on average per 1 molecule, and a number average molecular weight of 28,500.

Synthetic Example 2

To polyoxypropylene having 2.1 carbon-carbon unsaturated bonds on average on one terminal portion obtained in Synthetic Example 1 was added 36 ppm of a platinum divinyldisiloxane complex (3 wt % isopropanol solution based on platinum) per 100 parts by weight of the obtained polymer, and 2.2 parts by weight of trimethoxysilane was slowly added dropwise with stirring. The mixed solution was reacted at 90° C. for 2 hr, and the unreacted trimethoxymethylsilane was evaporated under reduced pressure to give linear reactive silicon group containing polyoxypropylene polymer (A-2) having 1.6 trimethoxymethylsilyl groups on one terminal portion, 3.2 silicon groups per 1 molecule, and a number average molecular weight of 28,500.

Synthetic Example 3

Propylene oxide was polymerized using polyoxypropylene diol having a molecular weight of about 2,000 as an initiator and zinc hexacyanocobaltate glyme complex as a catalyst to give polyoxypropylene diol having a number average molecular weight of about 14,600 (measured by a method similar to that in Synthetic Example 1). Then, a methanol solution containing 1.0 molar equivalent of NaOMe relative to the hydroxy group of polyoxypropylene having hydroxy group on the terminus was added, methanol was evaporated, then 1.0 equivalent of allyl glycidyl ether was added and the mixture was reacted at 130° C. for 2 hr. Then, a methanol solution containing 0.28 equivalent of sodium methoxide was added, methanol was removed, and 1.79 molar equivalents of 3-chloro-1-propene was added to convert the terminus hydroxy group to an allyl group. Unreacted allyl chloride was removed by evaporation under reduced pressure. Then, n-hexane (300 parts by weight) and water (300 parts by weight) were mixed and stirred with 100 parts by weight of the obtained unrefined allyl group terminal polyoxypropylene, and water was removed by centrifugation. Water (300 parts by weight) was further mixed and stirred with the obtained hexane solution, water was removed by centrifugation again, and hexane was removed by degassing under reduced pressures. As a result, polyoxypropylene polymer having 2.0 carbon-carbon unsaturated bonds on average on one terminal portion was obtained. Then, 36 ppm of a platinum divinyldisiloxane complex (3 wt % isopropanol solution based on platinum) was added per 100 parts by weight of the obtained polymer, and 3.6 parts by weight of dimethoxysilane was slowly added dropwise with stirring. The mixed solution was reacted at 90° C. for 2 hr, and the unreacted dimethoxymethylsilane was evaporated under reduced pressure to give linear reactive silicon group-containing polyoxypropylene polymer (A-3) having 1.6 dimethoxymethylsilyl group on average on one terminal portion, 3.2 silicon groups on average per 1 molecule, and a number average molecular weight of 14,600.

Synthetic Example 4

Isobutanol (48.6 parts by weight) was placed in a four-mouthed flask provided with a stirring machine, and the temperature was raised under a nitrogen atmosphere to 105° C. A mixed solution of n-butylmethacrylate (65.0 parts by weight), 2-ethylhexyl acrylate (25.0 parts by weight), 3-methacryloxypropyltrimethoxysilane (10.0 parts by weight), 3-mercaptopropyltrimethoxysilane (8.0 parts by weight), and 2,2'-azobis(2-methylbutyronitrile) (2.5 parts by weight) in isobutanol (22.7 parts by weight) was added dropwise thereto over 5 hr. Polymerization was performed at 105° C. for 2 hr to give an isobutanol solution (solid content 60 wt %) of (meth)acrylate-based polymer (B-1) having 1.6 silicon groups on average in one molecule, and a number average molecular weight of 2,100 (measured by a method similar to that in Synthetic Example 1). The reactive silicon group equivalent of the solid content is 0.75 mmol/g.

Synthetic Example 5

Isobutanol (48.6 parts by weight) was placed in a four-mouthed flask provided with a stirring machine, and the temperature was raised under a nitrogen atmosphere to 105° C. A mixed solution of n-butylacrylate (65.0 parts by weight), 2-ethylhexyl acrylate (25.0 parts by weight), 3-methacryloxypropyltrimethoxysilane (10.0 parts by weight), 3-mercaptopropyltrimethoxysilane (8.0 parts by weight), and 2,2'-azobis(2-methylbutyronitrile) (2.5 parts by weight) in isobutanol (22.7 parts by weight) was added dropwise thereto over 5 hr. Polymerization was performed at 105° C. for 2 hr to give an isobutanol solution (solid content 60 wt %) of (meth)acrylate-based polymer (B-2) having 1.6 silicon groups on average in one molecule, and a number average molecular weight of 2,100 (measured by a method similar to that in Synthetic Example 1). The reactive silicon group equivalent of the solid content is 0.75 mmol/g.

Synthetic Example 6

Isobutanol (29.2 parts by weight) was placed in a four-mouthed flask provided with a stirring machine, and the temperature was raised under a nitrogen atmosphere to 105° C. A mixed solution of methylmethacrylate (20.0 parts by weight), n-butylmethacrylate (36.0 parts by weight), stearylmethacrylate (32.0 parts by weight), 3-mercaptopropyltrimethoxysilane (12.0 parts by weight), and 2,2'-azobis(2-methylbutyronitrile) (4.5 parts by weight) in isobutanol (40.6 parts by weight) was added dropwise thereto over 5 hr. Polymerization was performed at 105° C. for 2 hr to give an isobutanol solution (solid content 60 wt %) of (meth)acrylate-based polymer (B-3) having 2.9 silicon groups on average in one molecule, and a number average molecular weight of 6,500 (measured by a method similar to that in Synthetic Example 1). The reactive silicon group equivalent of the solid content is 0.48 mmol/g.

Synthetic Example 7

Isobutanol (26.7 parts by weight) was placed in a four-mouthed flask provided with a stirring machine, and the temperature was raised under a nitrogen atmosphere to 105° C. A mixed solution of methylmethacrylate (20.0 parts by weight), n-butylacrylate (36.0 parts by weight), stearylmethacrylate (32.0 parts by weight), 3-mercaptopropyltrimethoxysilane (12.0 parts by weight), and 2,2'-azobis(2-methylbutyronitrile) (4.5 parts by weight) in isobutanol (43.1 parts by weight) was added dropwise thereto over 5 hr. Polymerization was performed at 105° C. for 2 hr to give an isobutanol solution (solid content 60 wt %) of (meth)acrylate-based polymer (B-4) having 2.9 silicon groups on average in one molecule, and a number average molecular weight of 6,200 (measured by a method similar to that in Synthetic Example 1). The reactive silicon group equivalent of the solid content is 0.48 mmol/g.

Synthetic Example 8

Isobutanol (51.7 parts by weight) was placed in a four-mouthed flask provided with a stirring machine, and the temperature was raised under a nitrogen atmosphere to 105° C. A mixed solution of methylmethacrylate (20.0 parts by weight), n-butylacrylate (36.0 parts by weight), stearylmethacrylate (32.0 parts by weight), 3-mercaptopropyltrimethoxysilane (12.0 parts by weight), and 2,2'-azobis(2-methylbutyronitrile) (1.5 parts by weight) in isobutanol (16.1 parts by weight) was added dropwise thereto over 5 hr. Polymerization was performed at 105° C. for 2 hr to give an isobutanol solution (solid content 60 wt %) of (meth)acrylate-based polymer (B-5) having 5.0 silicon groups on average in one molecule, and a number average molecular weight of 10,500 (measured by a method similar to that in Synthetic Example 1). The reactive silicon group equivalent of the solid content is 0.48 mmol/g.

Synthetic Example 9

Isobutanol (35.0 parts by weight) was placed in a four-mouthed flask provided with a stirring machine, and the temperature was raised under a nitrogen atmosphere to 105° C. A mixed solution of methylmethacrylate (10.0 parts by weight), n-butylacrylate (58.0 parts by weight), stearylmethacrylate (20.0 parts by weight), 3-mercaptopropyltrimethoxysilane (12.0 parts by weight), and 2,2'-azobis(2-methylbutyronitrile) (3.5 parts by weight) in isobutanol (34.1 parts by weight) was added dropwise thereto over 5 hr. Polymerization was performed at 105° C. for 2 hr to give an isobutanol solution (solid content 60 wt %) of (meth)acrylate-based polymer (B-6) having 3.1 silicon groups on average in one molecule, and a number average molecular weight of 6,500 (measured by a method similar to that in Synthetic Example 1). The reactive silicon group equivalent of the solid content is 0.48 mmol/g.

Synthetic Example 10

Isobutanol (35.0 parts by weight) was placed in a four-mouthed flask provided with a stirring machine, and the temperature was raised under a nitrogen atmosphere to 105° C. A mixed solution of methylmethacrylate (10.0 parts by weight), n-butylacrylate (62.5 parts by weight), stearylmethacrylate (20.0 parts by weight), 3-mercaptopropyltrimethoxysilane (7.5 parts by weight), and 2,2'-azobis(2-methylbutyronitrile) (3.5 parts by weight) in isobutanol (34.1 parts by weight) was added dropwise thereto over 5 hr. Polymerization was performed at 105° C. for 2 hr to give an isobutanol solution (solid content 60 wt %) of (meth)acrylate-based polymer (B-7) having 2.0 silicon groups on average in one molecule, and a number average molecular weight of 6,500 (measured by a method similar to that in Synthetic Example 1). The reactive silicon group equivalent of the solid content is 0.30 mmol/g.

Synthetic Example 11

Isobutanol (29.2 parts by weight) was placed in a four-mouthed flask provided with a stirring machine, and the temperature was raised under a nitrogen atmosphere to 105° C. A mixed solution of methylmethacrylate (12.0 parts by weight), n-butylmethacrylate (78.0 parts by weight), 3-mercaptopropyltrimethoxysilane (12.0 parts by weight), and 2,2'-azobis(2-methylbutyronitrile) (4.5 parts by weight) in isobutanol (40.6 parts by weight) was added dropwise thereto over 5 hr. Polymerization was performed at 105° C. for 2 hr to give an isobutanol solution (solid content 60 wt %) of (meth)acrylate-based polymer (B-8) having 2.5 silicon groups on average in one molecule, and a number average molecular weight of 5,500 (measured by a method similar to that in Synthetic Example 1). The reactive silicon group equivalent of the solid content is 0.48 mmol/g.

Synthetic Example 12

Isobutanol (29.2 parts by weight) was placed in a four-mouthed flask provided with a stirring machine, and the temperature was raised under a nitrogen atmosphere to 105° C. A mixed solution of methylmethacrylate (12.0 parts by weight), n-butylmethacrylate (58.0 parts by weight), stearylmethacrylate (20.0 parts by weight), 3-mercaptopropyltrimethoxysilane (12.0 parts by weight), and 2,2'-azobis(2-methylbutyronitrile) (4.5 parts by weight) in isobutanol (40.6 parts by weight) was added dropwise thereto over 5 hr. Polymerization was performed at 105° C. for 2 hr to give an isobutanol solution (solid content 60 wt %) of (meth)acrylate-based polymer (B-9) having 2.5 silicon groups on average in one molecule, and a number average molecular weight of 5,500 (measured by a method similar to that in Synthetic Example 1). The reactive silicon group equivalent of the solid content is 0.48 mmol/g.

Synthetic Example 13

Isobutanol (48.6 parts by weight) was placed in a four-mouthed flask provided with a stirring machine, and the temperature was raised under a nitrogen atmosphere to 105° C. A mixed solution of n-butylmethacrylate (65.0 parts by weight), 2-ethylhexyl acrylate (25.0 parts by weight), 3-methacryloxypropyltrimethoxysilane (19.3 parts by weight), n-dodecylmercaptan (4.0 parts by weight), and 2,2'-azobis(2-methylbutyronitrile) (2.5 parts by weight) in isobutanol (22.7 parts by weight) was added dropwise thereto over 5 hr. Polymerization was performed at 105° C. for 2 hr to give an isobutanol solution (solid content 60 wt %) of (meth)acrylate-based polymer (B-10) having 2.2 silicon groups on average in one molecule, and a number average molecular weight of 3,300 (measured by a method similar to that in Synthetic Example 1). The reactive silicon group equivalent of the solid content is 0.78 mmol/g.

Synthetic Example 14

Isobutanol (48.6 parts by weight) was placed in a four-mouthed flask provided with a stirring machine, and the temperature was raised under a nitrogen atmosphere to 105° C. A mixed solution of n-butylmethacrylate (65.0 parts by weight), 2-ethylhexyl acrylate (25.0 parts by weight), 3-methacryloxypropyltrimethoxysilane (11.0 parts by weight), n-dodecylmercaptan (4.0 parts by weight), and 2,2'-azobis(2-methylbutyronitrile) (2.5 parts by weight) in isobutanol (22.7 parts by weight) was added dropwise thereto over 5 hr. Polymerization was performed at 105° C. for 2 hr to give an isobutanol solution (solid content 60 wt %) of (meth)acrylate-based polymer (B-11) having 1.3 silicon groups on average in one molecule, and a number average molecular weight of 3,200 (measured by a method similar to that in Synthetic Example 1). The reactive silicon group equivalent of the solid content is 0.44 mmol/g.

Synthetic Example 15

Isobutanol (35.0 parts by weight) was placed in a four-mouthed flask provided with a stirring machine, and the temperature was raised under a nitrogen atmosphere to 105° C. A mixed solution of methylmethacrylate (10.0 parts by weight), n-butylacrylate (64.0 parts by weight), stearylmethacrylate (20.0 parts by weight), 3-mercaptopropyltrimethoxysilane (6.0 parts by weight), and 2,2'-azobis(2-methylbutyronitrile) (3.5 parts by weight) in isobutanol (34.1 parts by weight) was added dropwise thereto over 5 hr. Polymerization was performed at 105° C. for 2 hr to give an isobutanol solution (solid content 60 wt %) of reactive silicon group-containing (meth)acrylate-based polymer (P-1) having 1.6 silicon groups on average in one molecule, and a number average molecular weight of 6,500 (measured by a method similar to that in Synthetic Example 1). The reactive silicon group equivalent of the solid content is 0.24 mmol/g.

Synthetic Example 16

Isobutanol (26.7 parts by weight) was placed in a four-mouthed flask provided with a stirring machine, and the temperature was raised under a nitrogen atmosphere to 105° C. A mixed solution of methylmethacrylate (27.0 parts by weight), n-butylmethacrylate (36.0 parts by weight), stearylmethacrylate (32.0 parts by weight), 3-mercaptopropyltrimethoxysilane (5.0 parts by weight), and 2,2'-azobis(2-methylbutyronitrile) (4.5 parts by weight) in isobutanol (43.1 parts by weight) was added dropwise thereto over 5 hr. Polymerization was performed at 105° C. for 2 hr to give an isobutanol solution (solid content 60 wt %) of reactive silicon group-containing (meth)acrylate-based polymer (P-2) having 1.3 silicon groups on average in one molecule, and a number average molecular weight of 6,500 (measured by a method similar to that in Synthetic Example 1). The reactive silicon group equivalent of the solid content is 0.20 mmol/g.

Synthetic Example 17

Isobutanol (51.1 part by weight) was placed in a four-mouthed flask provided with a stirring machine, and the temperature was raised under a nitrogen atmosphere to 105° C. A mixed solution of methyl methacrylate (65.0 parts by weight), 2-ethylhexyl acrylate (25.0 parts by weight), 3-methacryloxypropyltrimethoxysilane (10.0 parts by weight), 3-mercaptopropyltrimethoxysilane (8.0 parts by weight), and 2,2'-azobis(2-methylbutyronitrile) (2.5 parts by weight) in isobutanol (22.7 parts by weight) was added dropwise thereto over for 5 hr. Polymerization was performed at 105° C. for 2 hr to give an isobutanol solution (solid content 60 wt %) of reactive silicon group-containing (meth)acrylate-based polymer (P-3) having 1.8 silicon groups on average in one molecule, and a number average molecular weight of 2,400 (measured by a method similar to that in Synthetic Example 1). The reactive silicon group equivalent of the solid content is 0.75 mmol/g.

The monomer compositions, molecular weights, reactive silicon group equivalent and the like of polymers (B-1)-(B-11) and (P-1)-(P-3) polymerized in Synthetic Examples 4-17 are shown in Table 1.

TABLE 1

| polymer (B) monomer composition | | Tg (° C.) of homopolymer | polymer B-1 | polymer B-2 | polymer B-3 | polymer B-4 | polymer B-5 | polymer B-6 |
|---|---|---|---|---|---|---|---|---|
| monomer | MMA[1] | 105 | | | 20.0 | 20.0 | 20.0 | 10.0 |
| | BMA[2] | 20 | 65.0 | | 36.0 | | | |
| | BA[3] | −55 | | 65.0 | | 36.0 | 36.0 | |
| | 2-EHA[4] | −50 | 25.0 | 25.0 | | | | |
| | SMA[5] | −100 | | | 32.0 | 32.0 | 32.0 | 20.0 |
| | TSMA[6] | — | 10.0 | 10.0 | 12.0 | 12.0 | 12.0 | 12.0 |
| | T-MSi[7] | — | 8.0 | 8.0 | | | | |
| | n-DM[8] | — | | | | | | |
| Mn | | | 2100 | 2100 | 6500 | 6200 | 10500 | 6500 |
| Mw | | | 3900 | 3900 | 10000 | 11000 | 20500 | 13650 |
| average number of silicon group per molecule | | | 1.6 | 1.6 | 2.9 | 2.9 | 5.0 | 3.1 |
| reactive silicon group equivalent amount (mmol/g) | | | 0.75 | 0.75 | 0.48 | 0.48 | 0.48 | 0.48 |

| polymer (B) monomer composition | | polymer B-7 | polymer B-8 | polymer B-9 | polymer B-10 | polymer B-11 | polymer P-1 | polymer P-2 | polymer P-3 |
|---|---|---|---|---|---|---|---|---|---|
| monomer | MMA[1] | 10.0 | 12.0 | 12.0 | | | 10.0 | | 65.0 |
| | BMA[2] | | 78.0 | 58.0 | 65.0 | 65.0 | | 27.0 | |
| | BA[3] | 62.5 | | | | | 64.0 | 36.0 | |
| | 2-EHA[4] | | | | 25.0 | 25.0 | | | 25.0 |
| | SMA[5] | 20.0 | | 20.0 | | | 20.0 | 32.0 | |
| | TSMA[6] | 7.5 | 12.0 | 12.0 | 19.3 | 11.0 | 6.0 | 5.0 | 10.0 |
| | T-MSi[7] | | | | | | | | 8.0 |
| | n-DM[8] | | | | 4.0 | 4.0 | | | |
| Mn | | 6500 | 5500 | 5500 | 3300 | 3200 | 6500 | 6500 | 2400 |
| Mw | | 13300 | 9500 | 9500 | 6400 | 6100 | 13000 | 10000 | 3900 |
| average number of silicon group per molecule | | 2.0 | 2.5 | 2.5 | 2.2 | 1.3 | 1.6 | 1.3 | 1.8 |

TABLE 1-continued

| | | | | | | | | |
|---|---|---|---|---|---|---|---|---|
| reactive silicon group equivalent amount (mmol/g) | 0.30 | 0.48 | 0.48 | 0.78 | 0.44 | 0.24 | 0.20 | 0.75 |

(1) methylmethacrylate
(2) n-butylmethacrylate
(3) n-butylacrylate
(4) 2-ethylhexylacrylate
(5) stearylmethacrylate
(6) 3-methacryloxypropyltrimethoxysilane
(7) 3-mercaptopropyltrimethoxysilane
(8) n-dodecyl mercaptan Synthetic Example 18

Propylene oxide was polymerized using butanol as an initiator and zinc hexacyanocobaltate glyme complex as a catalyst to give polyoxypropyleneoxide having a number average molecular weight of 7,000 (calculated by a method similar to Synthetic Example 1). Then, a methanol solution containing 1.2-fold equivalents of NaOMe relative to hydroxy group of hydroxy group terminus polyoxypropylene was added, methanol was evaporated, and 3-chloro-1-propene was added to convert the terminus hydroxy group to an allyl group. Then, 36 ppm of a platinum divinyldisiloxane complex (3 wt % isopropanol solution based on platinum) was added per 100 parts by weight of the obtained allyl group terminus polyoxypropylene polymer, and 1.69 parts by weight of dimethoxymethylsilane (1.72 parts by weight) was slowly added dropwise with stirring. The mixed solution was reacted at 90° C. for 2 hr to give linear reactive silicon group-containing polyoxypropylene polymer (C-1) having a dimethoxymethylsilyl group on the terminal, having 0.7 silicon group on average in one molecule, and a number average molecular weight of 7,000.

Synthetic Example 19

A methanol solution containing 1.2-fold equivalents of NaOMe was added to hydroxy group of polyoxypropylene diol having a number average molecular weight of 4,200 (calculated by a method similar to Example 1), and methanol was evaporated, and 3-chloro-1-propene was added to convert the terminus hydroxy group to an allyl group to give allyl group terminus polyoxypropylene polymer (C-2).

Example 1

The reactive silicon group-containing polyoxypropylene polymer (A-1) (60.0 parts by weight) obtained in Synthetic Example 1 and a solution (66.7 parts by weight) of reactive silicon group-containing (meth)acrylate-based polymer (B-1) obtained in Synthetic Example 4 in isobutanol were mixed, and isobutanol was evaporated under reduced pressure to give a curable composition having a weight ratio of polymers (A-1)/(B-1) of 60/40.

(Evaluation)

The viscosity of the produced curable compositions and tensile property of cured products were measured by the methods shown below.
(Viscosity)
The viscosity of a curable composition was measured at 23° C., relative humidity 50% by an E-type viscometer (manufactured by TOKYO KEIKI INC., measurement cone: 3° C.×R14). The results thereof are shown in Table 2.
(Appearance)
The appearance of the curable compositions was observed at 23° C., relative humidity 50%. A transparent curable composition was marked with "○", and a clouded composition was marked with "Δ". The results are shown in Table 2.
(Tensile Property)
Vinyltrimethoxysilane (manufactured by Momentive Performance Materials Inc., trade name: A-171) (1 part by weight), N-(2-aminoethyl)-3-aminopropyltrimethoxysilane (manufactured by Shin-Etsu Chemical Co., Ltd., trade name: KBM-603) (2 parts by weight), and dioctyltin dilaurate (manufactured by Nitto Kasei Co., Ltd., trade name: NEOSTANN U-810) (0.5 parts by weight) were added to 100 parts by weight in total of polymers (A-1) and (B-1), and the mixture was sufficiently mixed. The obtained blend was filled in a 3 mm-thick polyethylene frame without allowing entry of bubbles, and aged at 23° C., relative humidity 50% for 3 days, and further at 50° C. for 4 days to give a cured product. A No. 7 dumbbell was punched out from the obtained cured product according to JIS K 6251, subjected to a tensile test (tension speed 200 mm/min, 23° C., relative humidity 50%), and modulus at 50% elongation (M50), tensile strength at break (TB), and elongation rate at break (EB) were measured. The results thereof are shown in Table 2.

Examples 2-8, Comparative Examples 1-3

In the same manner as in Example 1 except that polymer (B) and polymer (P) were synthesized according to the compositions shown in Table 1, and polymer (A), polymer (B), dehydrating agent, adhesion imparting agent, and catalyst were mixed at the blending ratios shown in Table 2, evaluation was performed. As the viscosity, viscosity of a mixture of polymer (A) and polymer (B) was measured.

TABLE 2

| composition (parts by weight) | | Example 1 | Example 2 | Example 3 | Example 4 | Example 5 | Example 6 | Example 7 | Example 8 | Comparative Example 1 | Comparative Example 2 | Comparative Example 3 |
|---|---|---|---|---|---|---|---|---|---|---|---|---|
| polymer (A) | (A-1) | 60 | 60 | 60 | 60 | 60 | 60 | 60 | | 60 | 60 | 60 |
| | (A-2) | | | | | | | | 60 | | | |

TABLE 2-continued

| composition (parts by weight) | | Example 1 | Example 2 | Example 3 | Example 4 | Example 5 | Example 6 | Example 7 | Example 8 | Comparative Example 1 | Comparative Example 2 | Comparative Example 3 |
|---|---|---|---|---|---|---|---|---|---|---|---|---|
| polymer (B) | (B-1) | 40 | | | | | | | | | | |
| | (B-2) | | 40 | | | | | | | | | |
| | (B-3) | | | 40 | | | | | | | | |
| | (B-4) | | | | 40 | | | | | | | |
| | (B-5) | | | | | 40 | | | 40 | | | |
| | (B-6) | | | | | | 40 | | | | | |
| | (B-7) | | | | | | | 40 | | | | |
| polymer (P) | (P-1) | | | | | | | | | 40 | | |
| | (P-2) | | | | | | | | | | 40 | |
| | (P-3) | | | | | | | | | | | 40 |
| appearance 23° C. | | ○ | ○ | ○ | ○ | ○ | ○ | ○ | ○ | ○ | ○ | ○ |
| viscosity 23° C. | Pa · S | 27 | 14 | 82 | 37 | 58 | 26 | 28 | 62 | 25 | 132 | 125 |
| dehydrating agent | A-171[1] | 1 | 1 | 1 | 1 | 1 | 1 | 1 | 1 | 1 | 1 | 1 |
| adhesion imparting agent | KBM-603[2] | 2 | 2 | 2 | 2 | 2 | 2 | 2 | 2 | 2 | 2 | 2 |
| catalyst | Neostann U-810[3] | 0.5 | 0.5 | 0.5 | 0.5 | 0.5 | 0.5 | 0.5 | 0.2 | 0.5 | 0.5 | 1 |
| tensile test (No. 7 dumbbell) | M50 (MPa) | 0.7 | 0.7 | 1.0 | 0.8 | 0.6 | 0.7 | 0.5 | 0.6 | 0.4 | 0.3 | 1.7 |
| | TB (MPa) | 5.2 | 3.2 | 6.0 | 5.0 | 7.7 | 4.8 | 4.2 | 12.0 | 2.5 | 2.8 | 5.2 |
| | EB (%) | 300 | 230 | 300 | 250 | 200 | 250 | 290 | 190 | 250 | 400 | 180 |

[1]vinyltrimethoxysilane (Momentive Performance Materials Inc.)
[2]N-(2-aminoethyl)-3-aminopropyltrimethoxysilane (Shin-Etsu Chemical Co., Ltd.)
[3]dioctyltindilaurate (Nitto Kasei Co., Ltd.)

From the comparison of the Examples and Comparative Examples shown in Table 2, it is known that a curable composition containing polymer (A) and polymer (B) has low viscosity, and a cured product thereof is superior in tensile property. To achieve higher strength, it is preferable that polymer (B) have a higher molecular weight. It is clear that the monomer constituting polymer (B) favorably contains a larger amount of a monomer having a higher glass transition temperature of homopolymer. When the number average molecular weight is not less than 500-less than 4000 as in polymer (B-1), a monomer whose homopolymer having a glass transition temperature of not less than −25° C. is preferably used as the constituent monomer in a total amount of not less than 40 parts by weight. It is clear that polymer (B) having a number average molecular weight of not less than 4000, like polymer (B-3)-(B-7), affords a cured product having a high strength irrespective of the constituent monomer. In Comparative Example 1 using polymer (P-1) having a reactive silicon group equivalent of only 0.24 mmol/g, the breaking strength was only 2.5 MPa; however, in Example 7 using polymer (B-7) having a reactive silicon group equivalent of 0.30 mmol/g, the breaking strength was 4.2 MPa. Therefrom it is clear that the breaking strength is markedly improved when the reactive silicon group equivalent increases from 0.24 mmol/g to 0.30 mmol/g.

Example 9

The reactive silicon group-containing polyoxypropylene polymer (A-1) (60 parts by weight) obtained in Synthetic Example 1 and a solution (66.7 parts by weight) of reactive silicon group-containing (meth)acrylate-based polymer (B-3) obtained in Synthetic Example 6 in isobutanol were mixed, and isobutanol was evaporated under reduced pressure to give a polymer mixture having a weight ratio of polymer (A-1)/polymer (B-3) of 60/40. The polymer mixture (100 parts by weight) was mixed with reactive silicon group-containing polyoxypropylene based polymer (C-1) (30 parts by weight) obtained in Synthetic Example 16, fatty acid-treated calcium carbonate (manufactured by Shiraishi Calcium Kaisha, Ltd., trade name: HAKUENKA CCR) (40 parts by weight), a UV absorber (manufactured by Sumitomo Chemical Company, Limited, trade name: Sumisorb 400) (1 part by weight), and HALS (manufactured by ADEKA CORPORATION, trade name: Adekastab LA-63P) (1 part by weight). The mixture was sufficiently kneaded, and passed 3 times through three paint rolls to allow for dispersing. Thereafter, the mixture was dehydrated at 120° C. for 2 hr under reduced pressure, and the residue was cooled to 50° C. or below. Thereto were added vinyltrimethoxysilane (manufactured by Momentive Performance Materials Inc., trade name: A-171) (3 parts by weight) as a dehydrating agent, N-(2-aminoethyl)-3-aminopropyltrimethoxysilane (manufactured by Shin-Etsu Chemical Co., Ltd., trade name: KBM-603) (5 parts by weight) as an adhesiveness-imparting agent, and dioctyltin dilaurate (manufactured by Nitto Kasei Co., Ltd., trade name: NEOSTANN U-810) (1 part by weight) as a condensation catalyst, and the mixture was kneaded substantially in the absence of moisture. The obtained mixture was filled in a moisture-proof cartridge-type container, which was tightly sealed to give a one-component curable composition.

(Evaluation)

The viscosity of the produced curable compositions and tensile property of cured products were measured by the methods shown below.

(Viscosity)

Viscosity of the blend at a rotation number of 2 rpm or 20 rpm was measured at 23° C., relative humidity 50% by a BH-type viscometer, rotor No. 6 (manufactured by Toki Sangyo Co., Ltd.). The results thereof are shown in Table 3.

(Tensile Property)

A blend was filled in a 3 mm-thick polyethylene frame without allowing entry of bubbles, and aged at 23° C., relative humidity 50% for 3 days, and further at 50° C. for 4 days to give a cured product. A No. 7 dumbbell was punched out from the obtained cured product according to JIS K 6251, subjected to a tensile test (tension speed 200 mm/min, 23° C., relative humidity 50%), and modulus at 50% elongation (M50), tensile strength at break (TB), and elongation rate at break (EB) were measured. The results thereof are shown in Table 3.

Examples 10-19

Polymer (A-1), polymer (B-3), polymer (C-3), filler, UV absorber, HALS, dehydrating agent, adhesiveness-imparting agent, catalyst (tin compound, amine, carboxylic acid) at the compositions shown in Table 3 were mixed to give a curable composition, and the compositions were evaluated in the same manner as in Example 9. The results thereof are shown in the following Tables.

silicon group-containing (meth)acrylate-based polymer (B-3) obtained in Synthetic Example 6 in isobutanol were mixed, and isobutanol was evaporated under reduced pressure to give a polymer mixture having a weight ratio of polymer (A-1)/polymer (B-3) of 60/40. The polymer mixture (100 parts by weight) was mixed with reactive silicon group-containing polyoxypropylene based polymer (C-1) (30 parts by weight) obtained in Synthetic Example 16, and a polyoxypropylene derivative (manufactured by Sanyo Chemical Industries, Ltd., trade name: LBU-25) (20 parts by weight) and the mixture was sufficiently kneaded to give a curable composition.

TABLE 3

| composition (parts by weight) | | Example 9 | Example 10 | Example 11 | Example 12 | Example 13 | Example 14 | Example 15 | Example 16 | Example 17 | Example 18 | Example 19 |
|---|---|---|---|---|---|---|---|---|---|---|---|---|
| polymer (A) | A-1 | 60 | 60 | 60 | 60 | 60 | 60 | 60 | 60 | 60 | 60 | 60 |
| polymer (B) | B-3 | 40 | 40 | 40 | 40 | 40 | 40 | 40 | 40 | 40 | 40 | 40 |
| plasticizer (C) | C-1 | 30 | 30 | 30 | 30 | 30 | 30 | 30 | 30 | 30 | 30 | 30 |
| | LBU-25[1] | | | | | | | | | 20 | | |
| | UP-1080[2] | | | | | | | | | | 20 | |
| | UP-1061[3] | | | | | | | | | | | 20 |
| filler | Hakuenka CCR[4] | 40 | | | | | | | | | | |
| | NANO COAT S25[5] | | 40 | | | | | 40 | 40 | 40 | 40 | 40 |
| | NANOX #30[6] | | | 40 | | | | | | | | |
| | TIPAQUE R-820[7] | | | | 40 | | | | | | | |
| | hidirite H42 M[8] | | | | | 40 | | | | | | |
| | PANSIL Ultraspheres2000[9] | | | | | | 40 | | | | | |
| UV absorber | Sumisorb 400[10] | 1 | 1 | 1 | 1 | 1 | 1 | 1 | 1 | 1 | 1 | 1 |
| HALS | Adekaatab LA-63P[11] | 1 | 1 | 1 | 1 | 1 | 1 | 1 | 1 | 1 | 1 | 1 |
| dehydrating agent | A-171[12] | 3 | 3 | 3 | 3 | 3 | 3 | 3 | 3 | 3 | 3 | 3 |
| adhesion-imparting agent | KBM-603[13] | 5 | 5 | 5 | 5 | 5 | 5 | 5 | 5 | 5 | 5 | 5 |
| tin compound | Neostann U-810[14] | 1 | 1 | 1 | 1 | 1 | 1 | | | 1 | 1 | 1 |
| | Neostann U-50[15] | | | | | | | 3 | | | | |
| amine | N,N-diethyl-1,3-propanediamine | | | | | | | 0.5 | 0.5 | | | |
| carboxylic acid | Versatic 10[16] | | | | | | | | 2.5 | | | |
| viscosity (Pa·s) 23° C. | 2 rpm | 120 | 46 | 30 | 30 | 33 | 33 | 45 | 60 | 25 | 28 | 30 |
| | 20 rpm | 50 | 34 | 30 | 30 | 30 | 32 | 34 | 40 | 21 | 23 | 23 |
| tensile test (No. 7 dumbbell) | M50 (MPa) | 1.0 | 0.9 | 1.1 | 0.9 | 1.1 | 1.0 | 1.1 | 0.7 | 0.6 | 0.5 | 0.6 |
| | TB (MPa) | 3.4 | 3.8 | 4.8 | 5.0 | 4.7 | 4.7 | 4.8 | 4.5 | 3.2 | 3.3 | 3.3 |
| | EB (%) | 210 | 260 | 260 | 310 | 290 | 270 | 260 | 280 | 330 | 350 | 270 |

[1]polyoxypropylene derivative (Sanyo Chemical Industries, Ltd.)
[2]poly(meth)(meth)acrylate (Toagosei Co., Ltd.)
[3]poly(meth)(meth)acrylate (Toagosei Co., Ltd.)
[4]fatty acid treatment colloidal calcium carbonate primary particle size 0.08 μm (Shiraishi Calcium Kaisha, Ltd.)
[5]surface treatment ground calcium carbonate primary particle size 1.0 μm (MARUO CALCIUM CO., LTD.)
[6]ground calcium carbonate primary particle size 0.7 μm (MARUO CALCIUM CO., LTD.)
[7]titanium oxide (ISHIHARA SANGYO KAISHA, LTD.)
[8]aluminum hydroxide (SHOWA DENKO K.K.)
[9]hollow aluminasilica fine particles (TOLSA)
[10]2,4-di-tert-butylphenyl-3,5-di-tert-butyl-4-hydroxybenzoate (Sumitomo Chemical Company, Limited)
[11]HALS (ADEKA CORPORATION)
[12]vinyltrimethoxysilane (Momentive Performance Materials Inc.)
[13]N-(2-aminoethyl)-3-aminopropyltrimethoxysilane (Shin-Etsu Chemical Co., Ltd.)
[14]dioctyltindilaurate (Nitto Kasei Co., Ltd.)
[15]bisneodecanoic acid tin (Nitto Kasei Co., Ltd.)
[16]neodecanoic acid (Japan Epoxy Resins Co., Ltd.)

As shown in Table 3, it is clear that, by adding a particular filler to a composition containing polymer (A-1) and polymer (B-3), a cured product superior in the tensile property is obtained. As calcium carbonate, heavy calcium carbonate having a primary particle size of less than 1 μm is preferably used.

Example 20

The reactive silicon group-containing polyoxypropylene polymer (A-1) (60.0 parts by weight) obtained in Synthetic Example 1 and a solution (66.7 parts by weight) of reactive (Evaluation)

The produced curable compositions were evaluated in the same manner as in Example 1.

Examples 21-24

In the same manner as in Example 1 except that polymer (A), polymer (B), plasticizer (C), dehydrating agent, adhesion imparting agent, and catalyst were mixed at the composition shown in Table 4, evaluation was performed.

TABLE 4

| composition (parts by weight) | | Example 20 | Example 21 | Example 22 | Example 23 | Example 24 |
|---|---|---|---|---|---|---|
| polymer (A) | A-1 | 60 | 60 | 60 | 60 | 60 |
| polymer (B) | B-3 | 40 | 40 | 40 | 40 | 40 |
| plasticizer (C) | C-1 | 30 | 30 | 30 | 30 | 30 |
| | LBU-25[1] | 20 | | | | |
| | C-2 | | 20 | | | |
| | UP-1080[2] | | | 20 | | |
| | UP-1061[3] | | | | 20 | |
| | DINP[4] | | | | | 20 |
| dehydrating agent | A-171[5] | 1 | 1 | 1 | 1 | 1 |
| adhesion-imparting agent | KBM-603[6] | 2 | 2 | 2 | 2 | 2 |
| tin compound | Neostann U-810[7] | 0.5 | 0.5 | 0.5 | 0.5 | 0.5 |
| tensile test (No. 7 dumbbell) | M50 (MPa) | 0.3 | 0.3 | 0.3 | 0.3 | 0.3 |
| | TB (MPa) | 3.8 | 3.0 | 3.3 | 3.6 | 2.4 |
| | EB (%) | 480 | 370 | 420 | 420 | 280 |

[1]polyoxypropylene derivative (Sanyo Chemical Industries, Ltd.)
[2]poly(meth)(meth)acrylate (Toagosei Co., Ltd.)
[3]poly(meth)(meth)acrylate (Toagosei Co., Ltd.)
[4]phthalic acid diisononyl (J-PLUS Co., Ltd.)
[5]vinyltrimethoxysilane (Momentive Performance Materials Inc.)
[6]N-(2-aminoethyl)-3-aminopropyltrimethoxysilane (Shin-Etsu Chemical Co., Ltd.)
[7]dioctyltindilaurate (Nitto Kasei Co., Ltd.)

In Table 4, it is clear that a composition containing polymer (A-1) and polymer (B-3) affords a cured product superior in tensile property by the use of a high molecular weight plasticizer. Particularly, it is preferable to use a polyoxypropylene-based polymer and a (meth)(meth)acrylate polymer as plasticizer (C). It is preferable that the polyoxypropylene-based polymer be free of a hydroxyl group on the terminal.

Examples 25-28

In the same manner as in Example 1 except that polymer (A-1), polymer (A-3), polymer (B-8), and polymer (B-9) were mixed at the composition shown in Table 5, evaluation was performed

TABLE 5

| composition (parts by weight) | | Example 25 | Example 26 | Example 27 | Example 28 |
|---|---|---|---|---|---|
| polymer (A) | (A-1) | 60 | 60 | | |
| | (A-3) | | | 60 | 60 |
| polymer (B) | (B-8) | 40 | | 40 | |
| | (B-9) | | 40 | | 40 |
| appearance 23° C. | | Δ | ○ | Δ | ○ |
| dehydrating agent | A-171[1] | 1 | 1 | 1 | 1 |
| adhesion-imparting agent | KBM-603[2] | 2 | 2 | 2 | 2 |
| catalyst | Neostann U-810[3] | 0.5 | 0.5 | 0.5 | 0.5 |
| tensile test (No. 7 dumbbell) | M50 (MPa) | not evaluated | 0.8 | 0.6 | 0.5 |
| | TB (MPa) | | 4.9 | 4.0 | 5.5 |
| | EB (%) | | 300 | 160 | 180 |

[1]vinyltrimethoxysilane (Momentive Performance Materials Inc.)
[2]N-(2-aminoethyl)-3-aminopropyltrimethoxysilane (Shin-Etsu Chemical Co., Ltd.)
[3]dioctyltindilaurate (Nitto Kasei Co., Ltd.)

In Table 5, to secure compatibility of polymer (A) having a number average molecular weight of not less than 20,000 and polymer (B), and obtain a cured product having high strength, polymer (B) needs to contain (meth)acrylate monomer (b1-a) containing methyl (meth)acrylate and an alkyl group having 3-6 carbon atoms, and (meth)acrylate monomer (b1-b) having an alkyl group having 7-30 carbon atoms. The polymer mixture (A-1)/(B-8) in Example 25 shows lower compatibility and very high viscosity of the mixture as compared to the polymer mixture (A-3)/(B-8) in Example 27.

Example 29

The reactive silicon group-containing polyoxypropylene polymer (A-2) (60.0 parts by weight) obtained in Synthetic Example 13 and a solution (66.7 parts by weight) of reactive silicon group-containing (meth)acrylate-based polymer (B-10) obtained in Synthetic Example 4 in isobutanol were mixed, and isobutanol was evaporated under reduced pressure to give a curable composition having a weight ratio of polymers (A-2)/(B-10) of 60/40.
(Evaluation)

The viscosity of the produced curable compositions and tensile property of cured products were measured by the methods shown below.
(Appearance)

The appearance of the curable compositions was observed at 23° C., relative humidity 50%. A transparent curable composition was marked with "○", and a clouded composition was marked with "Δ". The results are shown in Table 6.
(Tensile Property)

Tin 2-ethylhexanoate (manufactured by Nitto Kasei Co., Ltd., trade name: Neostann U-28) (0.75 part by weight), and lauryl amine (0.13 part by weight) were added to 100 parts by weight in total of polymers (A-2) and (B-10), and the mixture was sufficiently mixed. The obtained blend was filled in a 3 mm-thick polyethylene frame without allowing entry of bubbles, and aged at 23° C., relative humidity 50% for 3 days, and further at 50° C. for 4 days to give a cured product. A No. 7 dumbbell was punched out from the obtained cured product according to JIS K 6251, subjected to a tensile test (tension speed 200 mm/min, 23° C., relative humidity 50%), and modulus at 50% elongation (M50), tensile strength at break (TB), and elongation rate at break (EB) were measured. The results thereof are shown in Table 6.

Example 30

In the same manner as in Example 29 except that polymer (A-2) and polymer (B-11) were mixed at the composition shown in Table 6, evaluation was performed

TABLE 6

| composition (parts by weight) | | Example 29 | Example 30 |
|---|---|---|---|
| polymer (A) | (A-2) | 60 | 60 |
| polymer (B) | (B-10) | 40 | |
| | (B-11) | | 40 |
| appearance 23° C. | | ○ | ○ |
| catalyst | Neostann U-28[(1)] | 0.75 | 0.75 |
| | lauryl amine | 0.13 | 0.13 |
| tensile test | M50 (MPa) | 1.4 | 0.4 |
| (No. 7 dumbbell) | TB (MPa) | 10.0 | 3.5 |
| | EB (%) | 100 | 100 |

[(1)]tin 2-ethylhexanoate (II) (Nitto Kasei Co., Ltd.)

In Table 6, it is clear that a composition containing (meth)acrylate-based polymer (B) having a reactive silicon group equivalent of not less than 0.30 mmol/g, and not less than 1.5 reactive silicon groups on average in one molecule is superior in tensile property. It is clear that polymer (B-10) having 2.2 reactive silicon groups on average in one molecule has breaking strength 2.9 times that of polymer (B-11) having 1.3 reactive silicon groups in one molecule.

INDUSTRIAL APPLICABILITY

The curable composition according to one or more embodiments of the present invention can be used as a pressure-sensitive adhesive, a sealing material for structures, boats and ships, automobiles, roads and the like, adhesive, blocking agent, insulation, vibration damper, acoustic insulation, foamed material, paint, spraying material, coating film waterproofing agent and the like. Since the curable composition according to one or more embodiments of the present invention is low viscous and superior in workability, and a cured product obtained by curing the curable composition according to one or more embodiments of the present invention is characterized by high strength and high elongation, it is preferably used as a sealing material, an adhesive or a coating film-waterproofing agent, and more preferably used as a coating film-waterproofing agent. Therefore, one or more embodiments of the present invention also provide a coating film-waterproofing agent containing the aforementioned curable composition.

In addition, it can be used for various uses including electric or electronic component materials such as solar battery rear surface sealant and the like, electrical insulating materials such as insulation covering material for electric wire or cable and the like, elastic adhesive, contact-type adhesive, spray-type sealing material, crack repairing material, tiling adhesive, powder coating, casting material, medical rubber material, medical adhesive, medical equipment sealing material, food packaging material, joint sealing material for jacket material such as sizing board and the like, coating material, primer, conductive material for shielding electromagnetic wave, thermally conductive material, hot melt material, electric/electronic potting agent, film, gasket, various molding material, as well as rustproof or waterproof sealing material for wire glass or laminate glass end surface (cut section), liquid sealant used for automobile parts, electric parts, various machine components and the like, and the like. Moreover, since it can be closely adhered to a wide range of substrates such as glass, porcelain, wood, metal, resin molded products and the like by itself or with the aid of a primer, it can also be used as various types of tight-sealing composition or adhesive composition. Furthermore, since the curable composition according to one or more embodiments of the present invention can be used as adhesive for interior panels, adhesive for exterior panels, tiling adhesive, stone finishing adhesive, ceiling finishing adhesive, floor finishing adhesive, wall finishing adhesive, vehicle paneling adhesive, electric or electronic or precision equipment assembly adhesive, sealing material for direct glazing, multi-layer glass sealing material, SSG method sealing material, or structure working joint sealing material.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A curable composition comprising:
  organic polymer (A) having more than one reactive silicon group on average per molecule, which is represented by formula (1):

$$-SiR^1_aX_{3-a} \qquad (1)$$

wherein $R^1$ is a substituted or unsubstituted hydrocarbon group having 1-20 carbon atoms, each X is independently a hydroxy group or a hydrolyzable group, and a is 0 or 1, and
  (meth)acrylate-based polymer (B) having a reactive silicon group represented by formula (2):

$$-SiX_3 \qquad (2)$$

wherein each X is as defined for the formula (1),
  wherein the polymer (B) has a reactive silicon group equivalent of not less than 0.30 mmol/g, and comprises a monomer (b1) in a proportion of not less than 40 wt % per 100 wt % of total monomers constituting the polymer (B),
  wherein the monomer (b1) is free of a reactive silicon group, and a glass transition temperature of a homopolymer of the monomer (b1) is not more than 80° C.,
  wherein the monomer (b1) comprises a (meth)acrylate monomer (b1-a) having an alkyl group having 3-6 carbon atoms and a (meth)acrylate monomer (b1-b) having an alkyl group having 7-30 carbon atoms, and a mixing ratio of the monomer (b1-a) and the monomer (b1-b) is (b1-a):(b1-b)=80:20-50:50 (parts by weight),
  wherein the polymer (A) has more than one reactive silicon group on average per terminal portion,
  wherein a mixing ratio of the polymer (A) and the polymer (B) is (A):(B)=80:20-50:50 (parts by weight), and
  wherein a tensile strength at break measured by a tensile test according to JIS K 6251 of a cured product obtained from the curable composition is not less than 3.2 MPa.

2. The curable composition according to claim 1, wherein the reactive silicon group of the polymer (B) is a trimethoxysilyl group.

3. The curable composition according to claim 1, wherein the polymer (B) has not less than 1.5 reactive silicon groups on average per molecule.

4. The curable composition according to claim 1, wherein a total amount of the monomer (b1-a) and the monomer (b1-b) is not less than 60 wt % per 100 wt % of the total monomers.

5. The curable composition according to claim 1, wherein organic polymer (A) comprises a polyoxyalkylene-based polymer as a main chain skeleton.

6. The curable composition according to claim 1, wherein the polymer (A) has a number average molecular weight of not less than 20,000.

7. The curable composition according to claim 1, wherein the polymer (B) has a number average molecular weight of not less than 4,000.

8. The curable composition according to claim 1, wherein the polymer (B) has a number average molecular weight of not less than 10,000.

9. The curable composition according to claim 1, wherein the polymer (B) has a number average molecular weight of 500 to less than 4,000.

10. The curable composition according to claim 1, wherein the polymer (B) further comprises methyl methacrylate as monomer (b2), where not more than 30 wt % of total monomers constituting polymer (B) are monomer (b2).

11. The curable composition according to any claim 1, wherein a mercapto compound is not used during polymerization of the polymer (B).

12. The curable composition according to claim 1, further comprising a high molecular weight plasticizer as plasticizer (C).

13. The curable composition according to claim 12, comprising polyoxyalkylene-based polymer as plasticizer (C).

14. The curable composition according to claim 12, comprising a (meth)acrylate-based polymer as plasticizer (C).

15. The curable composition according to claim 12, wherein the high molecular weight plasticizer has not more than one reactive silicon group on average per molecule.

16. The curable composition according to claim 1, further comprising, as a filler, heavy calcium carbonate having an average primary particle size of less than 1 µm.

17. The curable composition according to claim 1, further comprising titanium oxide as a filler.

18. The curable composition according to claim 1, further comprising aluminum hydroxide as a filler.

19. A coating film waterproofing agent comprising the curable composition according to claim 1.

20. A cured product obtained from the curable composition according to claim 1.

* * * * *